United States Patent [19]

Kurihara et al.

[11] Patent Number: 5,529,048
[45] Date of Patent: Jun. 25, 1996

[54] FUEL CONTROL AND FEED SYSTEM FOR GAS FUELED ENGINE

[75] Inventors: Noriyuki Kurihara; Yoshikatsu Iida; Hiromatsu Matsumoto, all of Iwata, Japan

[73] Assignee: Yamaha Hatsudoki Kabushiki Kaisha, Iwata, Japan

[21] Appl. No.: 161,708

[22] Filed: Dec. 3, 1993

Related U.S. Application Data

[60] Division of Ser. No. 903,616, Jun. 24, 1992, Pat. No. 5,337,722, which is a continuation-in-part of Ser. No. 869,374, Apr. 16, 1992, Pat. No. 5,251,602, and Ser. No. 869,373, Apr. 16, 1992, abandoned.

[30] Foreign Application Priority Data

| Apr. 20, 1991 | [JP] | Japan | 3-116991 |
| Apr. 20, 1991 | [JP] | Japan | 3-116992 |
| Apr. 20, 1991 | [JP] | Japan | 3-116993 |
| Apr. 20, 1991 | [JP] | Japan | 3-116994 |

[51] Int. Cl.⁶ .......................... F02D 41/14; F02G 43/00
[52] U.S. Cl. ........................ 123/685; 123/688; 123/527
[58] Field of Search ............................ 123/527, 585, 123/699, 700, 685, 472, 1 A, 688; 60/300, 284, 286

[56] References Cited

U.S. PATENT DOCUMENTS

| 3,646,924 | 3/1972 | Newkirk et al. | |
| 3,996,908 | 12/1976 | Brown, III et al. | |
| 3,996,909 | 12/1976 | Fischer | |
| 4,020,813 | 5/1977 | Hattori et al. | 123/685 |
| 4,089,311 | 5/1978 | Brettschneider et al. | 123/439 |
| 4,216,757 | 8/1980 | Romann | |
| 4,263,883 | 4/1981 | Treibie | 123/527 |
| 4,285,700 | 8/1981 | Fox | |
| 4,327,689 | 5/1982 | Rachel | 123/685 |
| 4,347,824 | 9/1982 | Pierson | 123/527 |
| 4,364,364 | 12/1982 | Subramaniam | 123/527 |
| 4,369,749 | 1/1983 | Sugi | |
| 4,369,751 | 1/1983 | Batchelor et al. | 123/527 |
| 4,385,613 | 5/1983 | Yoshida et al. | 123/491 |
| 4,404,947 | 9/1983 | Swanson | 123/527 |

(List continued on next page.)

FOREIGN PATENT DOCUMENTS

| 0346989 | 6/1989 | European Pat. Off. |
| 3321424 | 6/1983 | Germany |
| 57-23101 | 5/1982 | Japan |
| 58-217747 | 12/1983 | Japan |
| 59-176444 | 5/1984 | Japan |
| 60-32031 | 7/1985 | Japan |
| 62-131908 | 6/1987 | Japan |
| 192505 | 4/1989 | Japan |
| 2-118111 | 5/1990 | Japan |
| 2-118110 | 5/1990 | Japan |
| 2-191807 | 7/1990 | Japan |
| 1327513 | 4/1971 | United Kingdom |

OTHER PUBLICATIONS

European Search Report dated Feb. 10, 1993.

Primary Examiner—Thomas N. Moulis
Attorney, Agent, or Firm—Knobbe, Martens, Olson & Bear

[57] ABSTRACT

Several embodiments of engines and systems for fueling engines to reduce the emission of unwanted exhaust gas constituents and to improve the fuel economy of the engine. A catalytic converter is provided in the exhaust system and a gaseous fuel is used at least during starting so as to bring the catalytic converter up to its operating temperature rapidly without necessitating the provision of an enriched fuel/air mixture. An oxygen sensor is employed in the exhaust system and a feedback control system varies the fuel/air ratio of the engine during its running in response to the output of the oxygen sensor. In order to test that the oxygen sensor is at its operating condition before feedback control is initiated, a rich fuel mixture is supplied and this rich fuel mixture is discontinued immediately upon the receipt of a signal from the oxygen sensor indicating that a rich mixture exits. Applications of the principal to both air valve type of carburetors and conventional carburetors are disclosed.

91 Claims, 11 Drawing Sheets

U.S. PATENT DOCUMENTS

| | | | |
|---|---|---|---|
| 4,413,607 | 11/1983 | Batchelor et al. | 123/527 |
| 4,457,279 | 7/1984 | Teramura et al. . | |
| 4,485,792 | 12/1984 | van der Weide | 123/527 |
| 4,492,204 | 1/1985 | Bertsch et al. . | |
| 4,492,205 | 1/1985 | Jundt et al. . | |
| 4,517,134 | 5/1985 | Nakamura et al. | 123/439 |
| 4,528,957 | 7/1985 | Jundt et al. . | |
| 4,541,397 | 9/1985 | Young | 123/527 |
| 4,545,350 | 10/1985 | Nakamura et al. . | |
| 4,554,896 | 11/1985 | Sougawa . | |
| 4,572,149 | 2/1986 | Hasegawa et al. . | |
| 4,589,397 | 5/1986 | Stankewitsch . | |
| 4,606,319 | 9/1986 | Silva | 123/527 |
| 4,628,883 | 12/1986 | Kataoka | 123/492 |
| 4,638,783 | 1/1987 | Snyder | 123/527 |
| 4,686,951 | 8/1987 | Snyder | 123/527 |
| 4,696,278 | 9/1987 | Ito et al. | 123/493 |
| 4,699,630 | 10/1987 | Lee et al. | 123/578 |
| 4,742,808 | 5/1988 | Blumel et al. . | |
| 4,774,909 | 10/1988 | Dolderer | 123/1 A |
| 4,813,390 | 3/1989 | Bennett | 123/527 |
| 4,813,394 | 3/1989 | St. Clair | 123/527 |
| 4,829,957 | 5/1989 | Garretson et al. | 123/27 GE |
| 4,834,050 | 5/1989 | Uranishi et al. | 123/589 |
| 4,843,558 | 6/1989 | Bergmann et al. | 123/472 |
| 4,858,583 | 8/1989 | Sonntag . | |
| 4,864,991 | 9/1989 | Snyder | 123/525 |
| 4,867,127 | 9/1989 | Quichmayr et al. | 123/527 |
| 4,870,933 | 10/1989 | Mizuno | 123/585 |
| 4,915,081 | 4/1990 | Fujimoto et al. . | |
| 4,938,199 | 7/1990 | Sato et al. . | |
| 4,953,516 | 9/1990 | van der Weide et al. | 123/527 |
| 4,970,858 | 11/1990 | Matsuoka | 60/274 |
| 5,058,556 | 10/1991 | Fukuma et al. . | |
| 5,076,245 | 12/1991 | Jones | 123/527 |
| 5,101,799 | 4/1992 | Davis et al. | 123/527 |
| 5,115,782 | 5/1992 | Klinke et al. . | |
| 5,150,673 | 9/1992 | Hoshiba et al. | 123/179.15 |
| 5,150,690 | 9/1992 | Carter et al. | 123/525 |
| 5,172,678 | 12/1992 | Suzuki | 123/688 |
| 5,207,058 | 5/1993 | Sasaki et al. | 60/300 |
| 5,224,347 | 7/1993 | Yakabe et al. | 123/527 |
| 5,293,741 | 3/1994 | Kashiyama et al. | 60/284 |

5,529,048

FUEL CONTROL AND FEED SYSTEM FOR GAS FUELED ENGINE

REFERENCE TO RELATED APPLICATIONS

This application is a divisional of application Ser. No. 07/903,616, filed Jun. 24, 1992. Which application is a continuation in part of the applications entitled Fuel Supply System For Gas Fueled Engine, Ser. No. 07/869,374, filed Apr. 16, 1992, now U.S. Pat. No. 5,251,602 issued Oct. 12, 1993 and Air Intake System For Gas Fueled Engine, Serial No. 07/869,373 and filed Apr. 16, 1992, now abandoned in the names of Noriyuki Kurihara and Yoshikatsu Iida and assigned to the Assignee hereof.

BACKGROUND OF THE INVENTION

This invention relates to a fuel control and feed system for an internal combustion engine and more particularly to an improved emission control system for an internal combustion engine and particularly one fueled at least in part by a gaseous fuel.

The quest for developing internal combustion engines which can operate on fossil fuels and still preserve not only natural resources but protect the economy from pollution are well known. One way in which these goals can be accomplished is to power an internal combustion engine by a gaseous fuel stored under pressure as a liquid (LPG). Such gaseous fuels tend to burn cleaner than liquid hydrocarbons such as gasoline and hence prolong engine life and increase service intervals, particularly oil change intervals. In addition, these fuels give rise to the possibility of improved emission control for a number of reasons.

Previously it has been proposed to employ as a charge former for such gaseous fuels, a generally conventional type of carburetor having a fixed venturi section into which the main fuel circuit discharges. However, there is specific disadvantage with this type of system. Conventionally, the fixed venturi section cooperates with a fuel discharge circuit in which metering jets are employed for metering the amount of fuel and air blended at the main fuel discharge. However, the amount of fuel discharge will be depend upon the air flow through the venturi section and a fixed metering jet for both air and fuel will not, under all instances give the desired control over air/fuel ratio.

It is, therefore, a principal object of this invention to provide an improved carburetor and fuel flow system for a gaseous fueled engine.

It is a further object of this invention to provide a so-called "constant depression" or "air valve" carburetor that is designed to operate on a gaseous fuel.

Although it has been proposed to employ gaseous fuel for engines having air valve type of carburetors, these systems have not been completely successful in controlling and providing the desired air/fuel ratio under all running conditions. Particularly, in the transition from idle to off/idle gaseous fueled air valve carburetors have had a difficulty in maintaining the desired air/fuel ratio.

It is, therefore, a further object of this invention to provide an improved gaseous fueled carburetor for an internal combustion engine.

It is a further object of this invention to provide an improved gaseous fueled air valve carburetor for an internal combustion engine that embodies an idle circuit for improving the control of fuel/air ratio during the transition from idle to off/idle conditions and for handling variations in running conditions even during idle.

It should be readily apparent that in order to provide good emission control as well as good fuel economy, it is essential to provide a very accurate control of the fuel/air ratio. This is normally done by controlling the amount of fuel that is supplied to the engine. At times either fixed or variable air bleeds may be employed in the fuel discharge circuit, these concepts being normally applied to liquid fueled engines.

With a gaseous fueled engine, it is the normal practice to regulate the pressure of the fuel that is delivered from a source in which it is contained under pressure as a liquid to a pressure in which the fuel becomes gaseous and at which it is at or slightly above atmospheric pressure. Normally these systems include fuel and air controls that have fixed settings or which employ metering jets or metering rods that provide a variable setting dependent upon an engine condition such as intake manifold vacuum, throttle valve position or the like. However, such controls do not always provide adequate and immediate control of the air/fuel ratio of the engine.

It is, therefore, a still further object of this invention to provide an improved charge forming system wherein the amount of fuel supplied to the engine is varied by varying the amount of air that is bled to a fuel discharge circuit of the engine in response to sensed engine operating conditions.

It is a further object of this invention to provide an improved exhaust controlled air bleed system for a gaseous fueled engine to maintain the desired air/fuel ratio under all conditions.

Normally the fuel/air ratio of an engine is controlled by using some form of sensor in the engine that will sense either air/fuel ratio directly or oxygen content in the exhaust gases to arrive at a determination of a air/fuel ratio. These types of systems are so-called "feedback" control systems in that the resultant output of the engine is sensed and measured and this sensed output signal is then fed back to the fuel system to control the air/fuel ratio. Such systems can be highly effective, if the sensor provides an accurate indication of air/fuel ratio.

However, one of the most critical time periods in engine emission control is during start-up. During start-up the sensor, which may not operate below certain temperatures, cannot be relied upon to provide the initial control during starting and cold warm-up. As a result, it is very difficult with conventional engines to maintain accurate fuel/air ratios under these starting and warm-up conditions.

It is, therefore, a still further object of this invention to provide an improved control system that permits the control of air/fuel ratio during starting and warm-up.

It is a further object of this invention to provide an arrangement for quickly assuring that the sensor is in the appropriate condition to provide an accurate signal and thereafter immediately initiating air/fuel control by the sensor.

In addition to the problems as aforenoted with sensors for air/fuel ratio control, many exhaust systems employ catalytic converters for treating the exhaust gases to render certain pollutants more acceptable in order to reduce them. As is well known, many of these catalytic converters also require operation at an elevated temperature. Hence, these converters are not effective during cold starting and cold warm-up and, therefore, the exhaust emission control problems are further magnified.

Added to these difficulties is the fact that liquid fuel tends to condense out in the induction system of a conventional internal combustion engine during start-up at low temperatures and during running at low temperatures. In order to accommodate this condition, it has been the practice to supply a richer air/fuel mixture under cold starting and cold warm-up. This not only adversely effects the fuel economy, but also can have serious effects on exhaust emission control.

It is, therefore, a still further object of this invention to provide a system for an internal combustion engine having a catalytic converter wherein the converter can be rapidly heated during cold start and warm-up without requiring overly rich fuel/air mixtures.

It is a further object of this invention to provide an arrangement wherein a gaseous fuel may be employed during engine start-up to heat the catalytic converter quickly to its operating temperature.

SUMMARY OF TEE INVENTION

A first feature of this invention is adapted to be embodied in a charge forming and induction system for an internal combustion engine having a combustion chamber and an induction system for supplying a charge to the combustion chamber. The induction system comprises a charge forming device having an induction passage communicating at one end with atmospheric air and at the other end with the combustion chamber. A throttle valve is provided in the induction passage and means automatically control the position of the throttle valve to maintain a substantially constant pressure in the induction passage at the area of the throttle valve during running of the engine. A main fuel discharge circuit discharges into the induction passage and includes a fuel control valve for controlling the amount of fuel supplied to the main fuel discharge circuit. Means are provided for controlling the condition of the fuel control valve in response to the position of the throttle valve. An idle discharge circuit is provided for discharging fuel into the induction passage downstream of the throttle valve. A source of gaseous fuel under pressure as a liquid supplies fuel to the fuel discharge circuits.

A further feature of the invention is adapted to be embodied in a charge forming and induction system for an internal combustion engine having a combustion chamber and an induction system for supplying a charge to the combustion chamber. The induction system comprises a charge forming device having an induction passage communicating at one end with atmospheric air and at the other end with the combustion chamber. A throttle valve is provided in the induction passage and means automatically control the position of the throttle valve to maintain a substantially constant pressure in the induction passage at the area of the throttle valve during running of the engine. A fuel discharge circuit discharges into the induction passage and includes a fuel control valve for controlling the amount of fuel supplied to the fuel discharge circuit. Means are provided for controlling the condition of the fuel control valve in response to the position of the throttle valve. A source of gaseous fuel under pressure as a liquid supplies fuel to the fuel discharge circuit. The air/fuel ratio is controlled by selectively adding air to the fuel supplied to the fuel discharge circuit.

Another feature of the invention is adapted to be embodied in a control system for an internal combustion engine for controlling the emission of undesired exhaust gases. The engine has a combustion chamber and an induction system draws atmospheric air and delivers a charge to the combustion chamber. A charge former is provided for delivering fuel to the induction system. A source of gaseous fuel under pressure as a liquid is provided and means supply fuel from this source to the charge former. Means are provided for selectively adding atmospheric air with the fuel supplied from the source to the charge former for varying the air/fuel ratio discharged by the charge former. Air/fuel ratio sensor means are provided for sensing the air/fuel ratio of the engine and means adjust the air added to the system in response to the output of the sensor to maintain the desired air/fuel ratio during engine operation.

Another feature of the invention is adapted to be embodied in an emission control system for an internal combustion engine that has a combustion chamber. An exhaust system discharges exhaust gases from the combustion chamber to the atmosphere and an oxygen sensor is positioned in the exhaust system for sensing a rich oxygen condition in the exhaust gases of the engine. An induction system including charge forming means supplies fuel/air mixture into the combustion chamber for combustion therein. Means control the charge former from the signal of the oxygen sensor for maintaining a desired fuel/air ratio for exhaust emission control. Means are incorporated for delivering a rich air/fuel mixture to the combustion chamber for testing when the oxygen sensor begins to supply a signal indicative of a rich condition. Once the oxygen sensor supplies a signal indicative of a rich condition thereafter-the supply of the fuel/air mixture is controlled by the oxygen sensor.

Another feature of the invention is adapted to be embodied in an emission control system for an internal combustion engine that has a combustion chamber and an exhaust gas for discharging exhaust gases from the combustion chamber to the atmosphere. A catalyzer is provided in the exhaust system for treating the exhaust gases issuing from the combustion chamber. An induction system is incorporated for supplying a charge to the combustion chamber. A charge former supplies fuel to the induction system. A source of gaseous fuel stored under pressure supplies fuel from the source to the charge former in response to at least starting of the engine for rapid heating of the catalyzer to its operating temperature.

Still another feature of this invention is adapted to be embodied in a method of operating a charge forming and induction system for an internal combustion engine having a combustion chamber and an induction system for supplying a charge to the combustion chamber. The induction system comprises a charge forming device having an induction passage communicating at one end with atmospheric air and at the other end with the combustion chamber. A throttle valve is provided in the induction passage and means automatically control the position of the throttle valve to maintain a substantially constant pressure in the induction passage in the area of the throttle valve during running of the engine. A main fuel discharge circuit discharges into the induction passage and includes a fuel control valve for controlling the amount of fuel discharged by the main fuel discharge circuit. Means are provided for controlling the condition of the fuel control valve in response to the position of the throttle valve. An idle fuel circuit discharges fuel into the induction passage downstream of the main fuel discharge circuit. In accordance with this method a source of gaseous fuel under pressure as a liquid supplies fuel to the fuel discharge circuits.

Yet another feature of the invention is adapted to be embodied in a method of operating a charge forming and induction system for an internal combustion engine having a combustion chamber and an induction system for supplying a charge to the combustion chamber. The induction system comprises a charge forming device having an induction passage communicating at one end with atmospheric air and at the other end with the combustion chamber. A throttle valve is positioned in the induction passage and means automatically control the position of the throttle valve to maintain a substantially constant pressure in the induction passage in the area of the throttle valve during running of the engine. A fuel discharge circuit discharges into the induction passage and includes a fuel control valve for controlling the amount of fuel discharged by the fuel discharge circuit. Means are provided for controlling the condition of the fuel control valve in response to the position of the throttle valve. In accordance with this method a source of gaseous fuel under pressure as a liquid supplies fuel to the fuel discharge circuit and the fuel/air ratio is controlled by adding air to the fuel supplied to the fuel discharge circuit.

Another feature of the invention is adapted to be embodied in a control method for an-internal combustion engine for controlling the emission of undesired exhaust gases. The engine has a combustion chamber and an induction system draws atmospheric air and delivers a charge to the combustion chamber. A charge former is provided for delivering fuel to the induction system. A source of gaseous fuel under pressure as a liquid is provided and means supply fuel from this source to the charge former. In accordance with this method atmospheric air is selectively added with the fuel supplied from the source to the charge former for varying the air/fuel ratio discharged by the charge former. The air/fuel ratio of the engine sensed and the amount of air air bled to the system is adjusted to maintain the desired air/fuel ratio during engine operation.

A still further feature of the invention is adapted to be embodied in an emission control method for an internal combustion engine that has a combustion chamber. An exhaust system discharges exhaust gases from the combustion chamber to the atmosphere and the amount of oxygen sensor in the exhaust system is measured by an oxygen sensor for sensing a rich fuel condition in the exhaust gases of the engine. An induction system including charge forming means supplies fuel/air mixture into the combustion chamber for combustion therein. The charge former is adjusted for maintaining a desired fuel/air ratio for exhaust emission control. A rich air/fuel mixture is supplied to the combustion chamber for testing when the oxygen sensor begins to supply a signal indicative of a rich condition. Once the oxygen sensor supplies a signal indicative of a rich condition thereafter the supply of the fuel/air mixture is controlled by the oxygen sensor.

Another feature of the invention is adapted to be embodied in an emission control method for an internal combustion engine that has a combustion chamber and an exhaust system for discharging exhaust gases from the combustion chamber to the atmosphere. A catalyzer is provided in the exhaust system for treating the exhaust gases issuing from the combustion chamber. An induction system is incorporated for supplying a charge to the combustion chamber. A charge former supplies fuel to the induction system. In accordance with this method fuel from a source of gaseous fuel stored under pressure supplies fuel to the charge former in response to at least starting of the engine for rapid heating of the catalyzer to its operating temperature.

DETAILED DESCRIPTION OF THE PREFERRED EMBODIMENTS OF THE INVENTION

Figure 1:
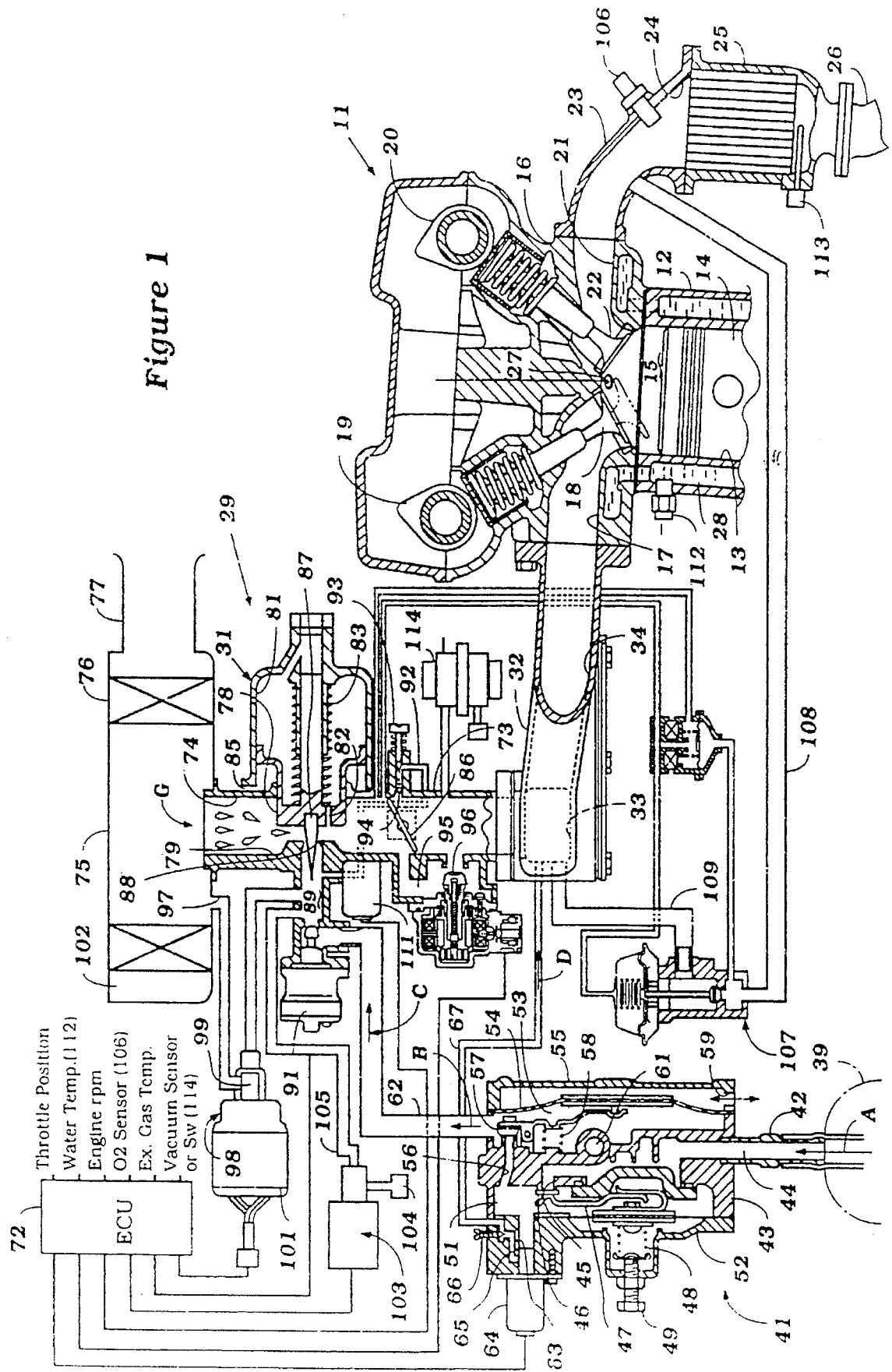
FIG. 1 is a partially schematic cross sectional view taken through a portion of an internal combustion engine constructed and operated in accordance with an embodiment of the invention.

Referring now in detail to the drawings and initially to FIG. 1, an internal combustion engine provided with a fuel supply system constructed in accordance with an embodiment of the invention is shown partially and identified generally by the reference numeral 11. The engine 11 is only shown partially because the internal details of the engine, except for its induction and charge forming system and the controls therefore, form no part of the invention. However, a portion of the engine 11 is depicted for ease in understanding how the invention may be practiced in conjunction with any known types of internal combustion engines. It also should be noted that the charge forming system is not limited to use in reciprocating engines of the type depicted but may be also employed with rotary type of engines. Also, the invention is described in conjunction with only a single cylinder of a multi-cylinder engine as it is believed that those skilled in the art can readily understand how the invention is practiced in conjunction with multiple cylinder engines and engines of varying configurations.

The engine 11 includes a cylinder block 12 having one or more cylinder bores 13 in which pistons 14 are slidably supported. The pistons 14 are connected in a known manner by connecting rods (not shown) to a crankshaft for providing an output from the engine 11. The cylinder bore 13 and head of the piston 14 form a combustion chamber 15 along with a cylinder head 16 that is affixed in a known manner to the cylinder block 12.

One or more intake passages 17 extend through one side of the cylinder head assembly 16 and have their communication with the combustion chamber 15 controlled by poppet valves 18 that are slidably supported in the cylinder head 16 in a well known manner.

One or more exhaust passages 21 extend through the opposite side of the cylinder head 16 from each combustion chamber 15. The flow through the exhaust passage 21 is controlled by poppet type exhaust valves 22 which are also operated by an overhead mounted exhaust camshaft 20 in a well known manner.

An exhaust manifold 23 is affixed to the exhaust side of the cylinder head 16 and receives the exhaust gases from the exhaust passages 21. An outlet 24 of the exhaust manifold 23 communicates with a catalytic converter 25 having a catalyst bed that includes a so called "three-way catalyzer" for oxidizing carbon monoxide (CO) and hydrocarbons (HC) while deoxidizing nitrous oxide ($NO_x$) to render the exhaust gases as harmless as possible. The exhaust gases thus treated are then discharged to the atmosphere through an exhaust pipe 26 and appropriate exhaust and muffler system (not shown).

In the illustrated embodiment, the engine 11 is of the four valve per cylinder type (i.e. two intake valves 18 and two exhaust valves 22 per cylinder). Of course, it should be readily apparent to those skilled in the art that certain features of the invention can be employed with engines having other types of valving or porting systems. A spark plug 27 is mounted in the cylinder head 16 and has its spark gap disposed centrally in the combustion chamber 15 for firing the charge therein in a well known manner.

The engine 11 is also water cooled in the illustrated embodiment and to this end the cylinder block 12 and cylinder head 16 are provided with a cooling jacket or cooling jackets 28 through which liquid coolant is circulated by means of a coolant pump (not shown). This coolant is then passed through an external heat exchanger (not shown) for cooling in a well known manner.

A fuel/air charge is supplied to the combustion chambers 17 by means of an induction and charge forming system, indicated generally by the reference numeral 29 and which includes a charge former in the form of a carburetor 31 which is mounted in the inlet section of an intake manifold 32 that extends along the intake side of the engine and which includes a plenum section 33. A plurality of individual runner sections 34 extend from the plenum section 33 to supply each of the intake ports 17 of the engine 11.

In accordance with the invention, the engine 11 is fueled with a gaseous fuel that is stored under pressure as a liquid in a pressure source, show in phantom at 39. The fuel stored within the source may be of any of the known hydrocarbon types of gaseous fuel such as butane, propane or a mixture thereof or any of the other well known and used gaseous fuels. As is well known, the heat content and burning characteristics of these gases vary from one to another and this is accommodated for in the system to be described in a manner which will become apparent. The fuel from the high pressure source 39 is delivered to a vaporizer and pressure regulator, indicated generally by the reference numeral 41 through an inlet conduit 42 of the regulator 41 as shown by the arrow A.

The regulator 41 is comprised of an outer housing assembly including a main body portion 43 in which an inlet passage 44 is formed that communicates with the inlet fitting 42. The passage 44 extends to a first pressure stage regulating port 45 which has its opening and closing controlled by a valve 46 that is operated by an assembly 47 which is biased by a spring 48 having its preload adjusted by a screw 49. The valve 46 opens and closes communication with a chamber 51 formed by the housing 43 and a first cover plate 52 so as to reduce the pressure of the gaseous fuel in a first stage to a pressure of about 0.3 $Kg/cm_2$ gage.

The first regulating chamber 51 communicates with a second regulating chamber 53 formed by a cavity in the side of the main housing member 43 opposite the cover plate 52 and which is closed by means of a diaphragm 54 held in place by a second cover plate 55. A passageway 56 communicates the chamber 53 with the chamber 51 and a second pressure regulating valve 57 operated by the diaphragm 54 controls the opening and closing of the passageway 56 so that gas will flow in the direction of the arrow B. A biasing spring 58 acts against the diaphragm 54 and the backside of the diaphragm 54 is opened to atmospheric pressure through an atmospheric port 59 so that the second regulating stage will reduce the pressure of the gaseous fuel in the chamber 53 to just slightly below atmospheric pressure.

The liquid coolant which has been heated in the engine cooling jacket 28 is also circulated through the regulator 41 and to this end there is provided an internal heating passage 61 formed in the main housing 43 which is in communication both with the gas entering the inlet passage 44 and the second regulating chamber 53 so as to maintain a more uniform temperature of the gas in the regulator 41 so as to insure better vaporization, regulation and better control of the pressure of the gaseous fuel delivered to the charge former 31.

An outlet conduit 62 delivers the two stage pressure regulated gaseous fuel to the main fuel circuit of the carburetor 31 as shown by the arrow C. This main fuel circuit will be described later.

Gaseous fuel is also supplied from the regulator 41 to an enrichment circuit in the manifold plenum chamber 33 but at a slightly higher pressure than the fuel pressure supplied to the main fuel circuit. To accomplish this, a second delivery passage 63 is formed in the cover plate 52 and communicates with the first regulating chamber 51. An electrically operated enrichment valve 64 controls the communication of the passage 63 with a further supply passage 65 formed in the cover 52. A flow controlling needle valve 66 communicates the passage 65 with a conduit 67 which extends to the plenum chamber 33 of the intake manifold 32 as indicated by the arrow D.

A CPU, indicated generally by the reference numeral 72 is provided for controlling the fuel system including the enrichment valve 64. The enrichment valve 64 is opened by the CPU 72 under conditions of cold start for a purpose to be described. This cold starting supply of fuel for enrichment purposes is not done for normal cold starting reasons. That is, the cold starting enrichment opening of the enrichment valve 64 is accomplished for a testing purpose which will be described and in accordance with a specific operational strategy. This strategy will be described later. In addition to this start-up testing strategy, the enrichment valve 64 may be opened to supply additional fuel under conditions of extreme acceleration, if desired.

The carburetor 31 is of the air valve or constant depression type and includes a main body portion 73 which defines an air horn 74 that receives atmospheric air, indicated by the arrow G, from a suitable air cleaner and/or air silencer 75. The air cleaner 75 has a filter element 76 through which air is drawn from an atmospheric air inlet 77 for filtration and silencing and delivery to the air horn 74 of the carburetor 31.

Since the carburetor 31 is of the air valve or constant depression type, it has no venturi section as such. Rather, it is provide with a sliding type of piston 78 which cooperates with an induction passage 79 formed downstream of the air horn 74 for changing the effective flow area and maintaining a constant vacuum in the induction passage at the piston 78. As is typical with this type of air valve carburetor, the sliding piston 78 is contained within a chamber 81 which receives air pressure from a point below the sliding piston 78 through a bleed port 82. A coil compression spring 83 is also provided in the chamber 81 so as to provide an opposing bias on the piston 78 toward its closed position. The opposite side of the chamber 81 is exposed to atmospheric through an atmospheric air port 85. As a result, as the vacuum or pressure in the induction passage downstream of the piston 78 decreases, the piston 78 will be urged inwardly into the chamber 81 to open the flow passage and maintain a substantially constant vacuum, as is well known in this art.

A manually operated throttle valve 86 is provided in the induction passage 79 downstream of the piston 78 and supplies air to the manifold 32 and specifically its plenum chamber 33.

The piston 78 carries a metering rod or needle valve 87 that cooperates with a main metering jet 88 of a fuel supply chamber 89. The metering rod 87 will cooperate with the metering jet 88 to provide a progressively increasing flow area as the piston 78 moves to open the induction passage 79. The taper of the metering rod 87 and jet 88 are configured so as to provide the desired fuel/air ratio, as will be determined by the performance of the engine. However, fine variations in air/fuel ratio are adjusted, in a manner which will be described.

The conduit 62 from the regulator 41 supplies the fuel chamber 89 of the carburetor 31. A stepping motor controlled fuel control valve 91 is incorporated for providing a fine adjustment of fuel flow from the conduit 62 into the fuel conduit 89. The fuel control valve 91 has a setting that is adjusted depending upon the type of fuel which is supplied to the engine and other characteristics including such things as flow resistance of the air cleaner 75 so as to maintain the desired fuel/air ratio. That is, it has been noted that the various forms of gaseous fuels may be employed and the fuel control valve 91 is operated so as to adjust the amount of fuel supplied depending upon the heat content of the fuel used.

As has been noted there are various types of gaseous fuels which may be available. Since the amount of fuel supplied is controlled generally by the cooperation of the metering rod 87 with the metering jet 88, the fuel flow is primarily volumetric in nature. The heat content per cubic foot of various gaseous fuels may be quite different. Thus, fuels that have a lower heat content per cubic foot require more fuel flow to maintain the desired fuel/air ratio while fuels having a higher fuel content require a lower fuel flow. Thus, if a higher heat content fuel is employed, the valve 91 is restricted further while if a lower heat content fuel is employed the valve 91 is opened to provide more fuel flow. In addition, a device may be provided to sense the pressure drop across the air cleaner 75 and specifically the element 76 and change the adjustment of the valve 91 as the flow restriction increases. This will insure against the mixture becoming overly rich as the filter element 76 accumulates foreign particles from the air inducted.

In accordance with an important feature of the invention, the carburetor 31 is also provided with an idle circuit that includes a passageway 92 that is supplied from the main fuel chamber 89. An adjustable needle valve 93 is incorporated in this conduit and controls the flow through an idle port 94 positioned downstream of the idle position of the throttle valve 86 so as to control idle fuel flow. In a conventional air valve or constant depression carburetor, an idle circuit is not normally supplied. However, in connection with this invention it is extremely important to control the air/fuel ratio accurately under all running conditions. If no idle circuit were supplied, the mixture would tend to be overly rich when operating at idle or, alternatively, would become somewhat lean when operating under off/idle conditions.

The reason for this is that there is an initial range of throttle movement from the idle to an off/idle position wherein the sliding piston 78 will not undergo any movement. Hence, if the mixture is at the proper mixture strength when operating at idle, as the system goes slightly off idle it will tend to lean out. To avoid this leaning out under off/idle, it has previously been the practice to provide a somewhat richer than necessary idle mixture which provides emission control problems.

By employing the separate idle circuit, it will be insured that the appropriate fuel/air ratio can be obtained under all conditions. For example, when operating at idle and the throttle valve 86 in its full idle position, some air will be bled into the fuel chamber 89 through the metering jet 88 and hence it is possible to obtain a leaning of the idle fuel supply. However, as the throttle valve 86 moves to the off/idle condition, then the manifold vacuum will be exerted at the metering jet 88 even though the piston 78 has not yet moved and the air bleed will be cut off and primarily fuel will be supplied through the idle discharge port 94 so as to avoid the leaning of the mixture which would occur in a carburetor not having an idle circuit. As a result of this, it is possible to control the air/fuel ratio as desired under idle or slightly off/idle conditions.

An idle bypass passageway 95 extends between the upstream and downstream sides of the throttle valve 86 when in its idle position and has an electrically controlled valve 96 for controlling the air bypassing the throttle valve 86 and, accordingly, adjusting the idle speed. The valve 96 is controlled by the ECU 72 so as to maintain stability in the idle speed. If the idle speed tends to fall below the desired idle speed, the valve 96 is opened so as to bypass additional air flow so as to increase the idle speed to the desired speed. On the other hand, if the idle speed is to high, the valve 96 will be closed to reduce the idle speed.

As is well known, the cooperation of the metering rod 87 with the metering jet 88 and the idle adjusting screw 93 are designed to provide control over the fuel/air ratio supplied to the engine combustion chambers 15. This type of carburetor is extremely effective in insuring good fuel/air control under all running conditions due to the use of the constant pressure drop through the induction passage provided for in the illustrated embodiment by the sliding piston 78. However, the adjustment provided by the metering rod 87 and main metering jet 88 and the idle adjusting screw 93 do not permit finite adjustments to accommodate variations in air/fuel ratio as may occur during normal running engine due to a variety of factors. Even small variations of air/fuel ratio can have significant differences in both the efficiency of operation of the catalytic converter 25 and also the total control of exhaust gas emissions. Therefore, in accordance with an important feature of this invention, an arrangement is provided for providing an even finer adjustment in the air/fuel ratio and a control arrangement for such an adjustment.

This adjustment includes an arrangement for mixing air with the fuel supplied to the chamber 89 of the carburetor 29. To this end, there is provided an air bleed port 97 which opens into the air cleaner 75 downstream of the filter element 76. The air bleed port 97 supplies air to an air bleed control valve 98 which includes a valve element 99 that is operated by a stepping motor 101 under control of the ECU 72 in a manner which will be described. The valve element 99 controls the flow of air from the inlet port 97 to the chamber 89 through an air bleed passage 102. As a result, the air/fuel ratio will be varied as atmospheric air is bled into the chamber 89 to provide a more accurate control of fuel/air ratio. Since the chamber 89 supplies both the main metering jet and the idle circuit through the line 92, the air/fuel ratio in each circuit will be adjusted by the air bleed valve 98.

Under sudden decelerations caused by rapid closure of the throttle valve 86 when the engine 11 is running at high speed, the fuel which is drawn into the combustion chambers will not burn but will be discharged into the catalytic converter. This fuel then will be burned by the catalyst and cause over temperature conditions to exist in the catalyst. To avoid this, there is provided a quick air bleed valve, indicated generally by the reference numeral 103 which draws atmospheric air from a source, such as through a filter element 104 or from the air cleaner 75 downstream of the filter element 76 and delivers it into the chamber 89 through a passageway 105. When a rapid deceleration condition is sensed, as may be sensed by the increase in vacuum in the induction passage, as for example as sensed by a vacuum switch 114, the quick air bleed valve 103 will be opened by the ECU 72. This will cause air rather than fuel to be drawn into the induction system through the main metering jet 88 and idle jet 94 and thus in effect shut off the supply of fuel to the engine under these conditions.

Reference has been made to the control of the air/fuel ratio through the air bleed valve 98. The air/fuel ratio is, in the illustrated embodiment, determined by means of an oxygen sensor, indicated generally by the reference numeral 106 which is positioned in the exhaust manifold 23 immediately upstream its outlet 24 to the catalytic converter 25. The oxygen sensor 106 is, in a preferred embodiment of the invention, of the type known as a λ sensor which senses when the air/fuel ratio is either stoichiometric or on the lean or rich side. This is determined by the output of a signal indicative of oxygen in the exhaust gases. If no oxygen is present, it is known that the engine is running at a richer than stoichiometric mixture and the sensor 106 will output a signal. If there is no output signal from the λ sensor 106, then it is known that the mixture is operating at stoichiometric or on the lean side, as is preferred.

The engine 11 is also provided with an EGR system for controlling $NO_x$ emissions and this includes an EGR valve, indicated generally by the reference numeral 107 which controls the flow of exhaust gases through an EGR line 108 leading from the exhaust manifold 23 back to the plenum chamber 33 of the intake manifold 32 through a second EGR line 109. The EGR valve 107 may be controlled in any suitable manner and by means of any suitable strategy.

As has already been noted, the ECU 72 controls a number of components of the engine including the enrichment valve 64, the idle control valve 96, the high speed bleed 103, the fuel control valve 91 and the air bleed valve 98. In addition, there is provided an idle fuel cutoff valve 111 that controls the flow through the idle discharge line 92 to shut off the flow of idle fuel under certain conditions, as will be described. This valve 111 is also controlled by the ECU 72. The valve 111 functions to achieve basically the same effect as the quick air bleed valve 103 and in some conditions it need not be necessary to supply both the idle shut-off valve 111 and the quick air bleed valve 103.

Certain ambient and engine running conditions are supplied to the ECU 72 to implement its control strategy. These inputs are, for example, indicative of throttle position as provided for by a throttle position sensor (not shown), engine coolant temperature as supplied by a coolant temperature sensor 112 that extends into the water jacket 28 of the engine, engine speed as provided for by an engine speed sensor (not shown), the output from the λ sensor 106, and exhaust gas temperature as provided for by an exhaust temperature sensor 113 that extends into the catalytic converter 25 which not only indicates engine exhaust gas temperature but also temperature at which the converter 25 is operating. There is further provided a vacuum sensor or switch 114 that senses intake manifold vacuum downstream oft he throttle valve 86 and outputs its signal to the ECU. In addition to these noted sensors, various other ambient or running conditions may be sensed and inputted to the ECU 72 for its engine control and operation.

Figure 2A:
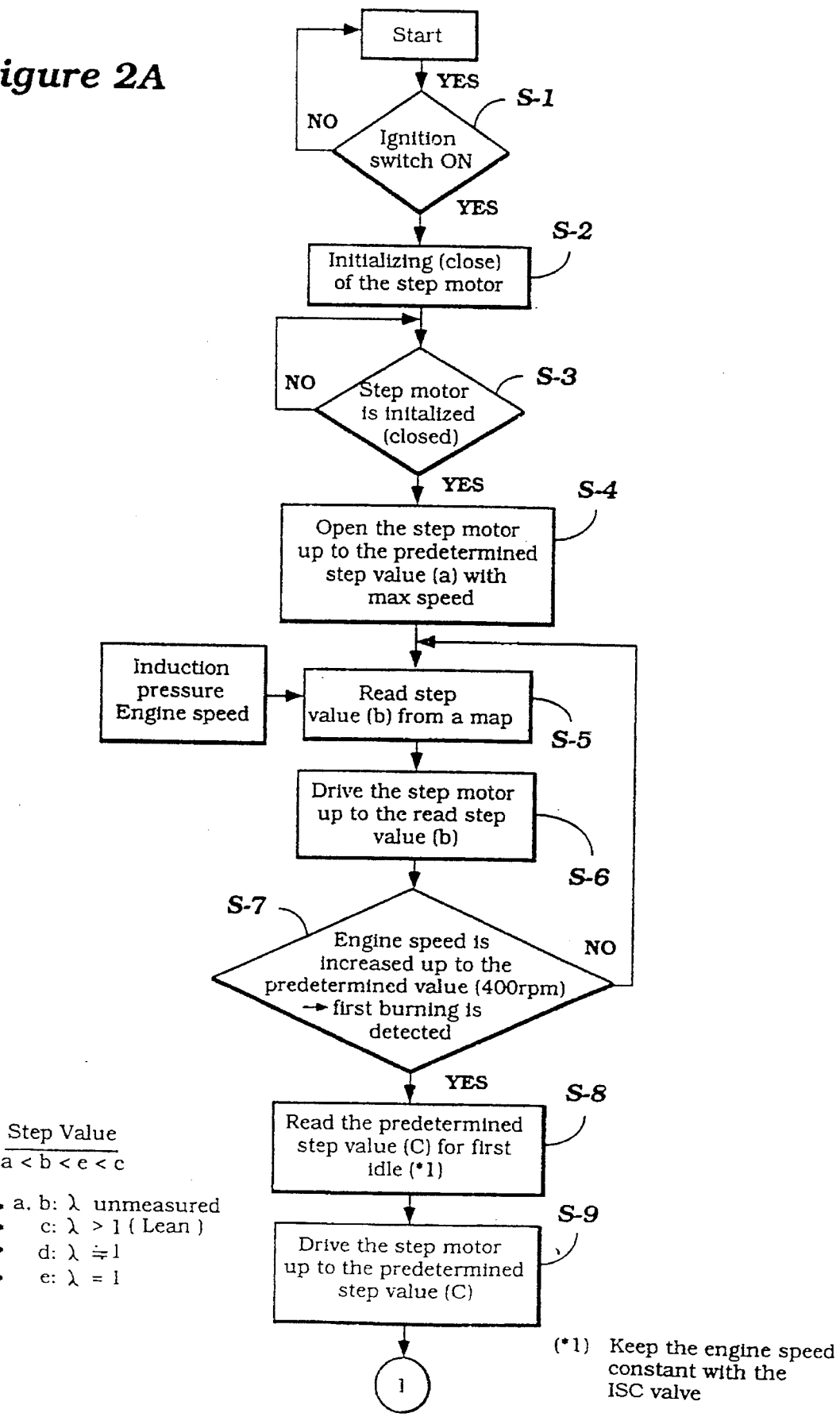
FIG. 2 is a block diagram flow chart showing the starting procedure for an engine in accordance with a first embodiment of the invention.
Figure 2B:
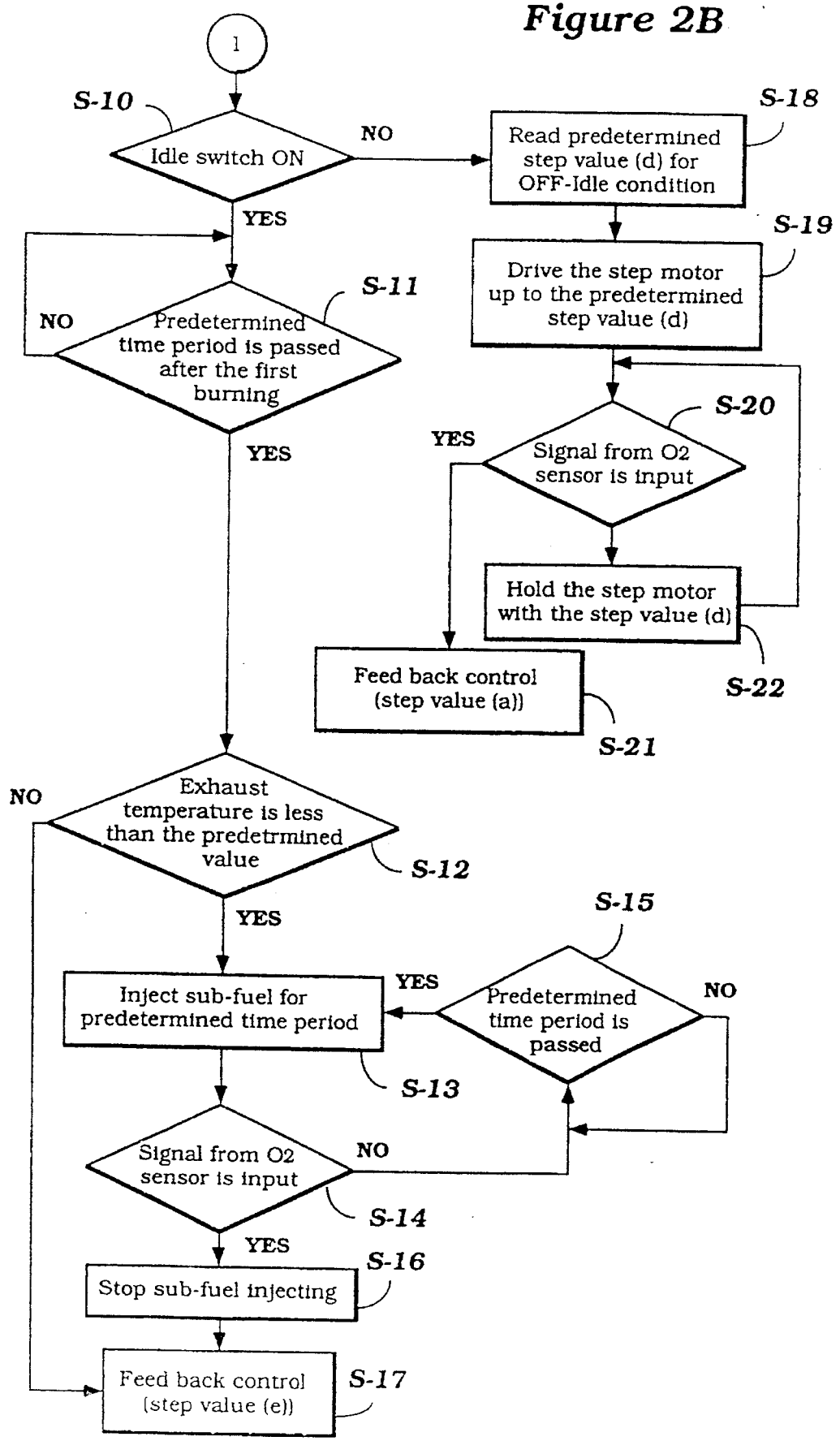

A control routine for operating the engine 11 of the embodiment of FIG. 1 during initial starting will now be described by reference to FIG. 2. FIG. 2 is a block diagram of a control routine wherein the ECU 72 is provided with a map only for determining the setting of the various components during the cranking period. That is, there is not a map in the ECU for controlling the various components under all running and ambient conditions.

Referring now specifically to FIG. 2, when the program is started, it moves to the Step S-1 to determine if the ignition switch for the engine is turned on. If the ignition switch is not turned on, the program obviously returns to start. If, however, the ignition switch is determined to be on at the Step S-1 the program moves to the Step S-2 to initialize or close the stepping motor 101 of the air bleed valve 98.

It should be noted that the stepping motor 101 of the air bleed valve 98 can operate at a variety of speeds. The faster the speed, the quicker the adjustment of the valve 99 is made. As will be described later, the stepping speed is operated at a first, lower speed ratio when the engine is operating at idle, at a faster speed ratio when the engine is operating at off/idle. During initial starting of the engine, the stepping motor 101 is operated at its maximum speed so as to initially close the stepping motor as quickly as possible.

It should be noted that at this time, the main fuel control valve 91 is moved to a position determined by the fuel employed, in the manner as previously described so as to set the initial position for the main fuel control valve 91. The quick air bleed valve 103 is closed and the idle shutoff fuel valve 111 is opened at this time. In a similar manner, the idle speed control valve 96 is set at the predetermined position so as to establish the idle speed. In addition, the enrichment valve 64 is held in a closed position. This is an important feature of this invention as, unlike conventional engines, it is a feature of the invention that no enrichment is provided during initial cranking or starting operation, regardless of the ambient condition.

With conventional engines, and particularly those operating on liquid fuels, it has been necessary to provide additional fuel enrichment during cranking because of the problem of fuel condensation in the induction system and even in the combustion chamber. However, with a gaseous fuel this is not a problem and particularly when using a carburetor of the air valve type such as the carburetor 31, it will be insured that the desired fuel/air mixture will be present in the combustion chamber 15 even under cold starting. Under starting, the carburetor 31 is set so as to provide a mixture that is leaner than stoichiometric when it is first started. This-is particularly important in that it has been found that such a lean mixture will cause the catalyst 25 to be heated quickly to its operating temperature once the catalyst 23 is partially activated. Further it is not necessary to supply additional fuel, as is required in some conventional engines, because condensation is not a problem.

The program then moves to the Step S-3 to determine if the stepping motor 101 is at its initialized closed position. If not, the program continues to repeat until it is determined that the stepping motor 101 is at its closed position and the air bleed valve 98 is fully closed. When this is determined, the program then moves to the Step S-4 to operate the stepping motor 101 so as to open the air bleed valve 98 to an initial setting "a" at maximum speed. The initial setting "a" is the smallest of the fixed setting of the air bleed valve 98 and thus provides the richest mixture.

The program then moves to the Step S-5 wherein engine parameters such as induction system pressure and engine speed are read by the respective sensors, aforenoted, and another value "b" for the air bleed valve 98 is selected dependent upon these parameters. The value "b" is slightly greater than the value "a" to provide more bleed air and is chosen so as to insure that there will be adequate fuel for starting but a mixture which is leaner than stoichiometric The program then moves to the Step S-6 so as to actually position the stepping motor 101 so as to place the air bleed valve 98 in the "b" condition as determined by a map only for initial idle start-up conditions based on induction system pressure and engine speed. The program then moves to the Step S-7 to determine if the engine speed is greater than a predetermined value such as 400 R.P.M. This is a speed that is slightly higher than the cranking speed of the engine and will indicate that first burning of the charge in the combustion chamber 15 has been assured. If it has not, the program repeats back to the Step S-5.

If, however, at the Step S-7 it has been determined that the engine speed is above 400 R.P.M and, therefore, running of the engine is assured, the program moves to the Step S-8 to set the air bleed valve 98 in a value "c", which is greater than the pre-mentioned values and hence which provides a greater air flow and leaner fuel/air mixture from the carburetor discharge circuits.

This value "c" is determined from the preprogrammed map of the ECU 72. This value "c" is shown on the chart of FIG. 4 which indicates the various control regions. The value "c" may, for example, be a stepping value of 55 which is slightly more than half way open of the full movement of the air bleed valve 99, the total range being considered to be 100. This semi-midrange condition is chosen so as to insure that the air bleed valve assembly 98 will have a full range of movement so as to provide the desired air/fuel ratio control under all conditions of the engine and ambient conditions.

It should be noted that at this time, the operation of the idle air control valve 96 is initiated so as to insure that the idle speed of the engine is maintained constant at the preprogrammed desired idle speed contained within the ECU 36. The program then moves to the Step S-9 so as to operate the stepping motor 101 so as to place the air bleed valve 99 of the air bleed control 98 in the value "c" position.

The program then moves to the Step S-10 to determine that the engine is still being operated at idle speed. This is determined by a throttle position or idle position control that determines whether the throttle valve 86 is in its idle position. If the throttle control is still in the idle position, then the program moves to the Step S-11 to determine if a predetermined time period, set by a counter in the ECU 72, has elapsed. This is to insure that the engine has run for some predetermined minimum period of time.

The program then moves to the Step S-12 to determine if the exhaust is at a temperature which indicates that it warmed up sufficiently so that the oxygen sensor 106 will be at an adequate temperature to go to feedback control. Oxygen sensor 106 (as previously noted a λ sensor) does not provide an indication of air/fuel ratio until it is at a certain predetermined temperature. Also the catalytic converter 25 will not begin to successfully treat the fuel until it also is at a predetermined temperature which temperature is somewhat close to the temperature at which the oxygen sensor 106 begins to provide a signal (about 250° C.).

If, at the time the engine is started, it is determined at the Step S-12 the exhaust temperature sensed by the sensor 113 is below the value at which it may be assumed that the oxygen sensor 106 and converter 25 are at their operating temperatures, then the program moves to the Step S-13 to inject additional fuel into the induction system by opening the enrichment valve 64 and permitting fuel to flow into the plenum chamber 33 of the intake manifold 32 and the combustion chambers 15. This additional fuel is supplied not for the purpose of enrichment but to provide a fuel/air mixture which will effect an output from the oxygen sensor 106 as soon as it is at its operating temperature. That is, if during normal start-up the oxygen sensor does not output a signal, this can be due to either the fact that the mixture is running lean or that the oxygen sensor is not at its operating temperature. Therefore, in accordance with another important feature of the invention, additional fuel is supplied so as to artificially create a rich air/fuel mixture so as to be able to detect immediately when the oxygen sensor 106 is at its operating temperature.

The program then moves to the Step S-14 to determine if an output signal is received by the ECU 76 from the oxygen sensor 106 indicating a rich fuel/air mixture. If no signal is sensed, the program moves to a Step S-15 to determine if a predetermined time period has passed. This time period is also set by a further timer in the ECU 72 and insures that excessive amounts of enrichment fuel will not be supplied merely to detect the operation of the oxygen sensor 106. If this time period has passed and the oxygen sensor has not output a signal, the program moves back to the Step S-13 so as to initiate another injection of auxiliary enrichment fuel by opening the enrichment valve 64.

Figure 4:
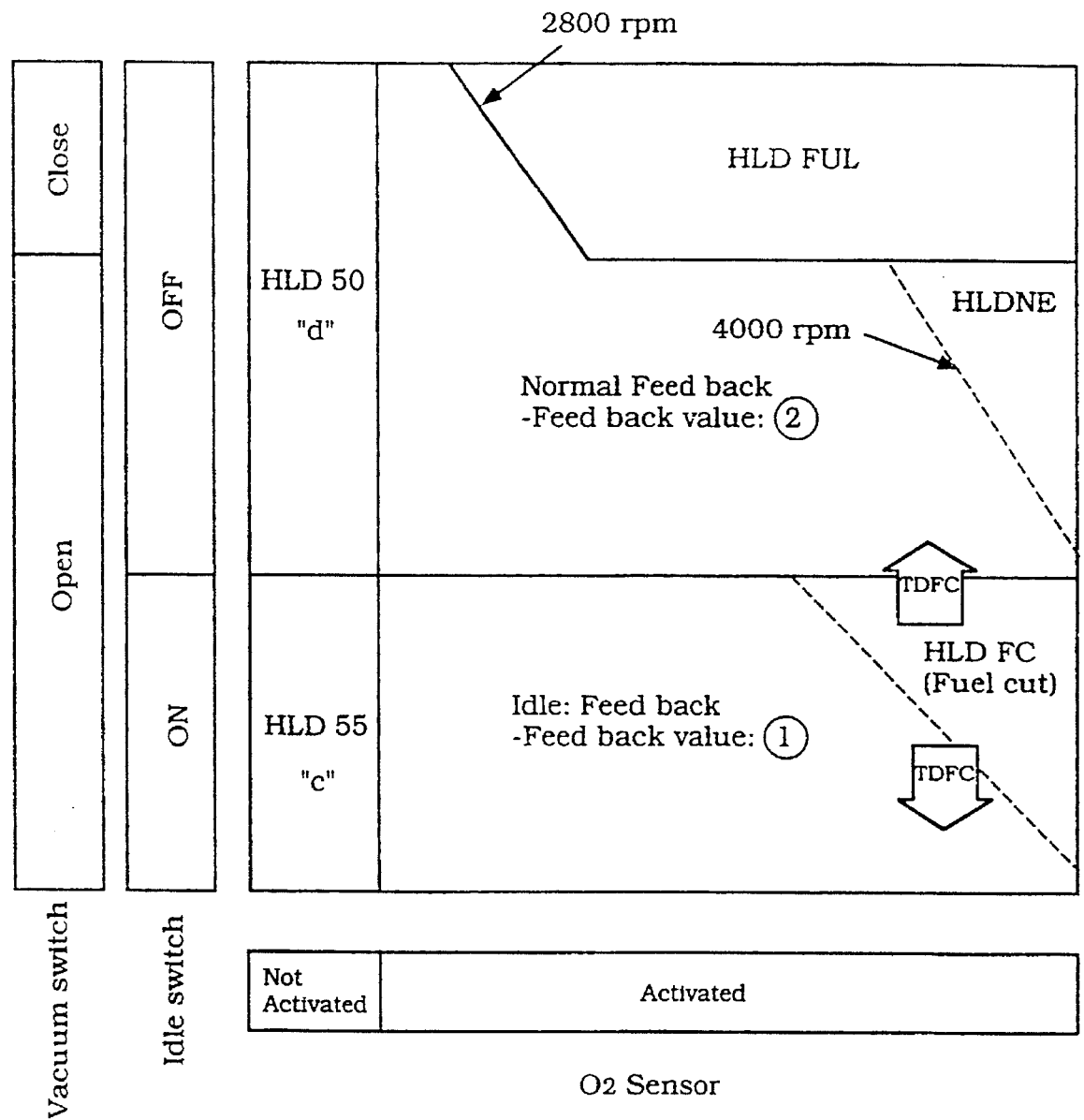
FIG. 4 is a graphical view showing the various control regions during the running of the engine.

If, at the Step S-14 an output signal is indicated from the oxygen sensor 106, the program moves to the Step S-16 to discontinue the supply of additional enrichment fuel by closing the enrichment valve 64. The program then moves to the Step S-17 to initiate feedback control and to operate the stepping motor 98 in accordance with a feedback control, as will be described, so as to maintain the appropriate fuel/air ratio under all conditions. The feedback control ranges are shown in FIG. 4 and occur after the oxygen sensor is determined as being activated, as shown therein.

If at the Step S-10 it is determined that the operator has moved the throttle valve 86 to an off/idle condition, then the program moves to a Step S-18 to determine what the value of the position off the air bleed valve 98 should be for that off/idle condition. This off/idle setting is initially set at "d" which is greater than the value "b" but less than the value "c". The value "d" is shown in FIG. 4 and because it is somewhat smaller than the value "c", the fuel/air mixture at off/idle will tend to be slightly richer than that at idle. The stepping motor 101 is then actuated at the Step S-19 so as to so set the air bleed valve 99.

The program then moves to the Step S-20 to determine if a signal is outputted from the oxygen sensor 106. Again, this is done so as to determine if the oxygen sensor 106 is at an adequate or proper temperature for feedback control. If it is, the program moves to the Step S-21 so as to assume feedback control, in a manner which will be described.

If, on the other hand, at the Step S-20 it is determined that there is no output from the oxygen Sensor 106, the program moves to a Step S-22 to hold the value of the air bleed valve 98 in the condition "d" and the program repeats back to the Step S-20 to continue to hold this condition until an output signal is delivered from the oxygen sensor 106.

Figure 3A:
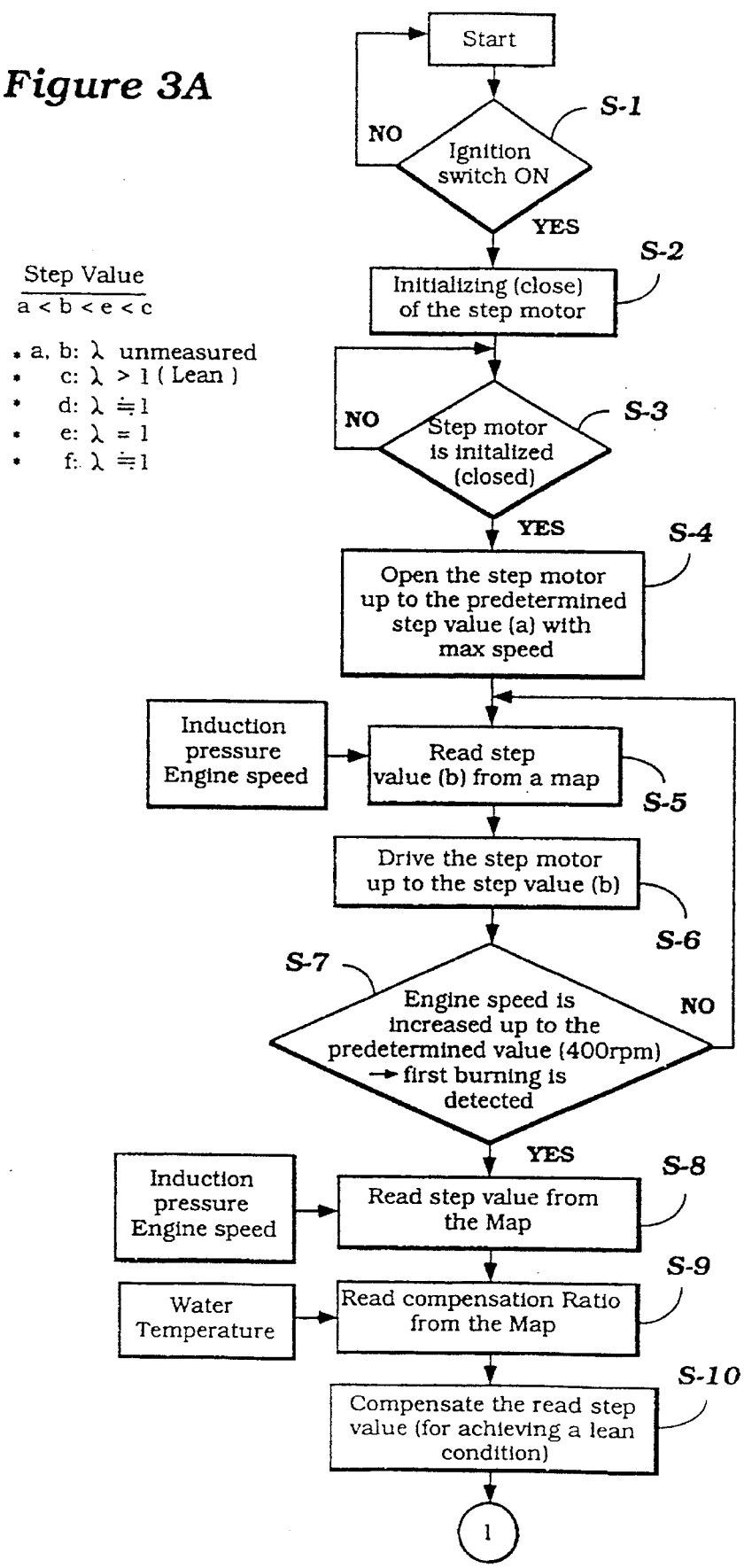
FIG. 3 is a block diagram flow chart showing the starting operation in accordance with another embodiment of the invention.
Figure 3B:
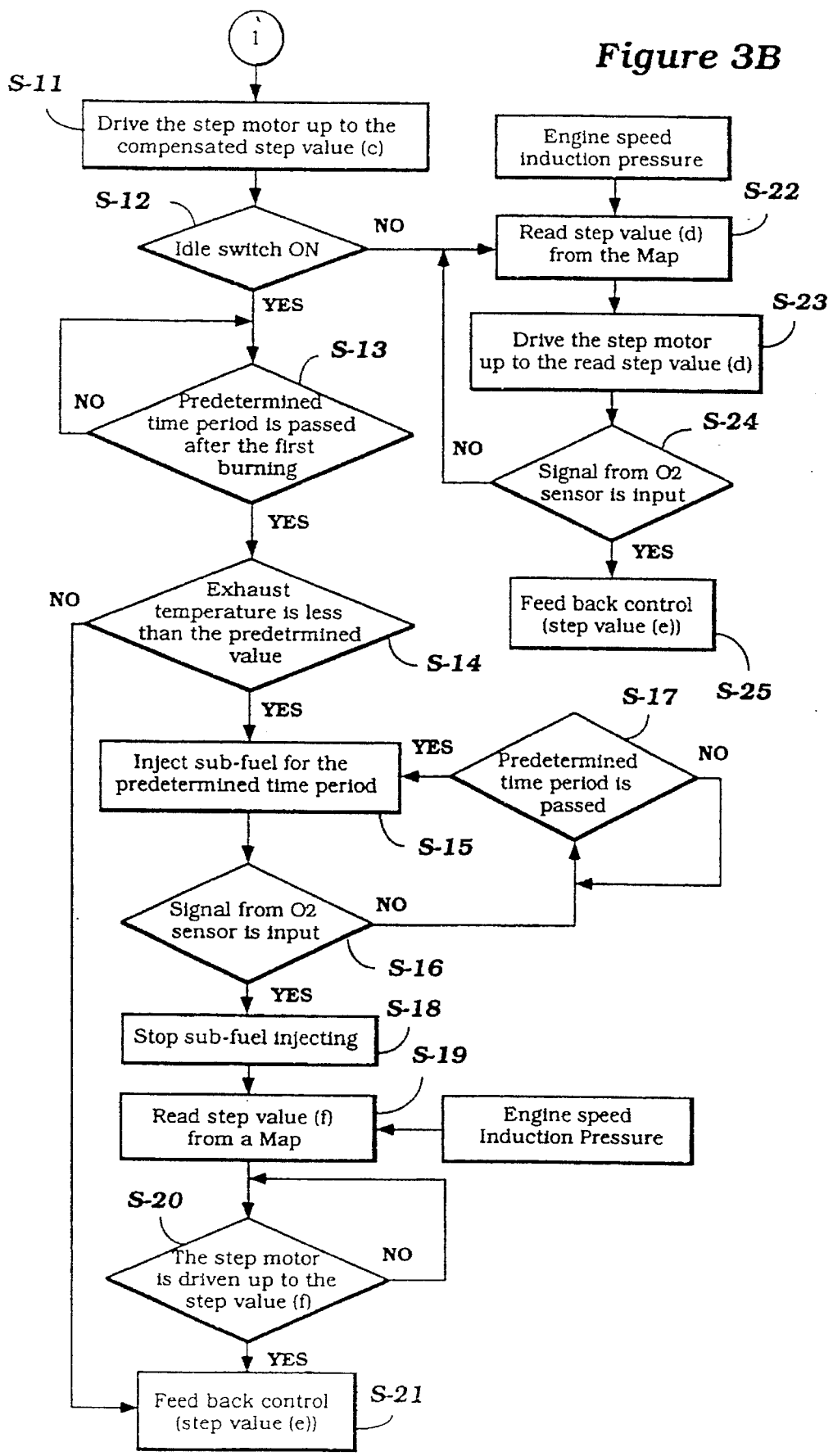

As has been noted, FIG. 2 illustrates a control routine wherein the ECU 72 does not have a map for setting the air/fuel ratio under all running conditions (only for starting) in order to achieve a stoichiometric mixture and reliance is made on feedback control primarily for this purpose. FIG. 3 shows a start-up control routing for an arrangement wherein the ECU 72 is provided with a map for all running conditions.

Referring now to this figure, the program starts and then moves to the Step S-1 so as to determine whether or not the ignition switch is on. If it is not, the program obviously repeats. However, if the ignition switch is on then the program moves to the Step S-2 so as to initialize or close the air bleed valve 98 at the most rapid speed of the stepping motor 101. At the same time, and as has been previously described, the quick air bleed valve 103 and idle fuel shutoff valves 111 will be maintained in their closed and opened positions, respectively. The fuel control stepping motor 91 will be actuated to initialize the position of the fuel control, in the manner previously described and the idle speed adjusting valve 96 will also be initially set.

The program then moves to the Step S-3 to determine if the air bleed valve 98 has been initialized (closed). If it has not, the program repeats.

If, however, it is determined at the Step S-3 that the air bleed valve 98 has been closed, then the program moves to the Step S-4 so as to open the air bleed valve. To open the air bleed valve 98 to an initial pre-set value "a" at a maximum speed. The value "a" may be the same as the value "a" previously noted.

The program then moves to the Step S-5 so as to read the induction system pressure and the engine speed from the previously noted sensors and then sets a step value "b" for the air bleed valve 98 that will provide a leaner mixture. The program then moves to the Step S-6 so as to drive the stepping motor 101 at its most rapid speed so as to place the air bleed valve 98 in the value "b" position.

The program then moves to the Step S-7 to determine if first burning is detected and the engine is running. If it is not, the program repeats back to the Step S-5.

If, however, it is determined at the Step S-7 that the engine is running, first burning detected, the program then moves to the Step S-8 to read the desired stepping value for the given engine induction pressure and engine speed.

The program then moves to the Step S-9 so as to sense the water temperature by the sensor 112 and read from the pre-program map a compensation value for the setting of the air bleed valve 98 from that found at the Step S-8. The program then moves to the Step S-10 to select the compensation value from the map to a lean value and then to the Step S-11 to set the appropriate value by operating the stepping motor 101 of the air bleed valve 98.

In accordance with this control routine the program then moves to the Step S-12 to determine if the engine is still operating at idle because the throttle valve 86 is still in its idle position as determined by the throttle position sensor, as aforenoted. If the engine is still in idle, the program moves to the Step S-13 to determine if a predetermined time period has passed since initial running of the engine. If it has, then the program moves to the Step S-14 to determine if the water temperature is elevated which, as aforenoted, will indicate whether or not the oxygen sensor 106 will be at its operating temperature. I f the water temperature is less than a predetermined value, the program moves to the Step S-15 to actuate the enrichment device 103 and provide enrichment fuel. As previously noted, this enrichment fuel is supplied only to provide a rich fuel/air mixture so as to determine if the oxygen sensor 106 is at its operating temperature.

The program then moves to the Step S-16 to determine if an output signal is outputted from the oxygen sensor 106. If it is not, the program repeats to the Step S-17 to determine if the predetermined time period has passed during which the enrichment valve actuator 64 is actuated. If it has and still no output is sensed from the oxygen sensor 106, the program repeats to the Step S-15 to supply additional fuel until an output signal is sensed from the oxygen sensor 106 at the Step S-16.

Once an output signal is sensed from the oxygen sensor at the Step S-16, the program moves to the Step S-18 to stop enrichment fuel by closing the enrichment device 64. The program then moves to the Step S-19 where engine speed, induction pressure and other parameters are sensed and then a value "f" for the position of the air bleed valve 98 is determined from the preprogrammed map in the ECU 72. The program then moves to the Step S-20 to drive the stepper motor 101 to place the air bleed valve 98 in the position "f". This continues until the air bleed valve is in this position and then the program moves to the Step S-21 to go to feedback control wherein the air bleed valve 98 is moved initially to the position "e" and then feedback control is initiated.

If at the Step S-12 it is determined that the engine throttle valve 86 has been moved by the operator to the off/idle condition, the program moves to the Step S-22 wherein engine parameters such as engine speed and induction pressure are sensed and a predetermined value "d" for the air bleed valve 98 is read from the map in the ECU 72. The program then moves to the Step S-23 to operate the stepper motor 101 and place the air bleed valve 98 in the position "d" and the program then moves to the Step S-24 to determine if an output signal is sensed by the oxygen sensor 106. If not, the program repeats back to the Step S-22. If, however, the oxygen sensor 106 is outputting a signal, then it is known that the system is in condition for feedback control and the program moves to the Step S-25 so as to initiate feedback control.

The further details of the feedback control and the various control routines once feedback control has been entered into will now be described by particular reference to FIGS. 4 through 9. Referring first to FIG. 4, this is a graphical view showing various engine running characteristics, the condition of the idle switch that determines when the throttle valve 86 is in the idle condition or in the off/idle condition, the conditions when the exhaust temperature is sensed by the temperature sensor 113 as below and above the predetermined value and also the condition of the vacuum sensor valve 114. As will be seen there is a demarcation in the control strategies when the engine is in idle or off/idle condition as indicated by the horizontal line indicating the condition of the aforenoted idle switch. When the engine is operating in the idle mode, a feedback value "1" is chosen which value is lower than the feedback value when operating in off/idle. By referring to a low feedback value, this indicates that the rate of change of the condition of the air bleed valve 98 and specifically its stepping motor 101 occurs at a slower rate than when operating under normal feedback in off/idle when the feedback value is "2". Other transient conditions are also present and will be described later.

Figure 5:
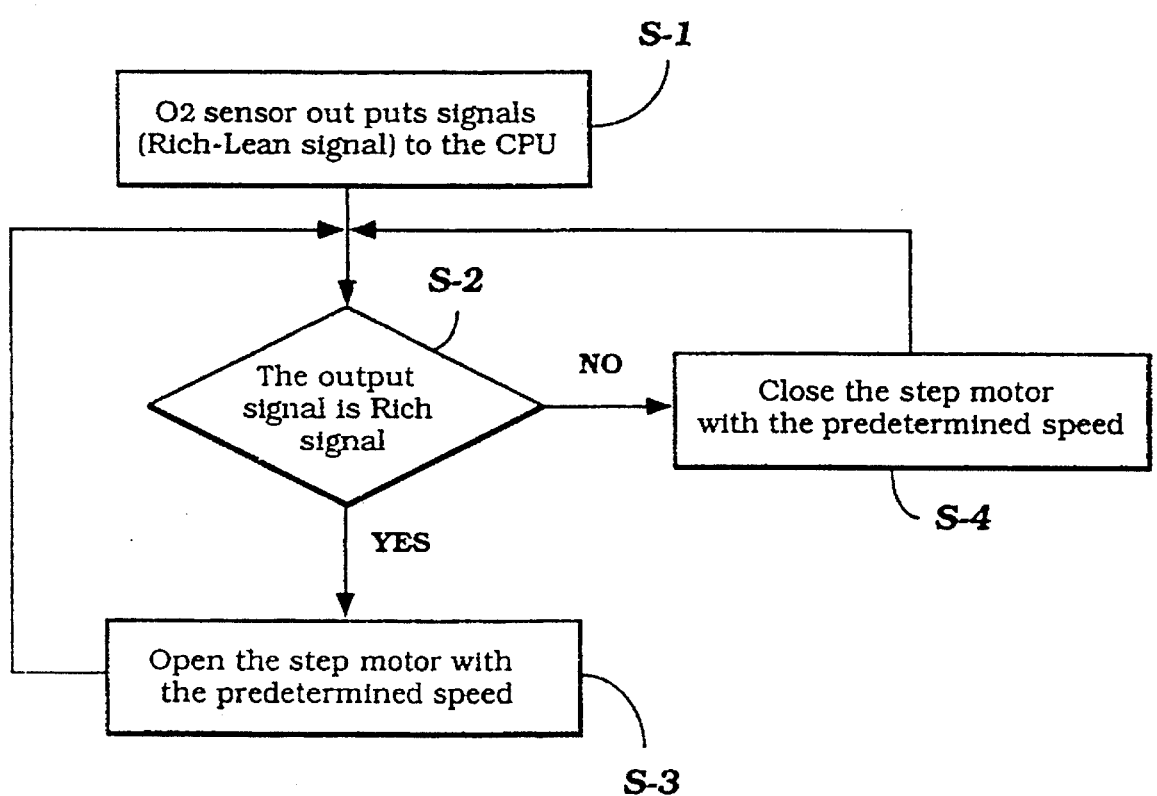
FIG. 5 is a block diagram showing how feedback control is established in the engine.

Referring now to FIG. 5, this is a block diagram that shows the basic strategy of feedback control regardless of whether operating under the idle or off/idle condition. As will be seen in this Figure, at the Step S-1, the ECU 72 receives a signal from the oxygen sensor 106 which is indicative of whether the mixture is rich (no $O_2$ an output signal) or stoichiometric or lean, $O_2$ condition (no output signal). The output signal of the oxygen sensor 106 is actually independent of the type of fuel employed. That is, the oxygen sensor 106 will output its signal when the mixture is richer than stoichiometric regardless of the fuel being burned. On the other hand, if the mixture is stoichiometric or less, the oxygen sensor 106 will output no signal.

After the program starts the output signal of the oxygen sensor 106 is compared within the ECU at the Step S-2 to determine, if a rich mixture is present. If it is, then the air/fuel ratio is increased at the Step S-3 by operating the stepping motor 101 of the air bleed 98 so as to introduce additional air into the air/fuel mixture supplied to the carburetor fuel chamber 89.

Figure 6:
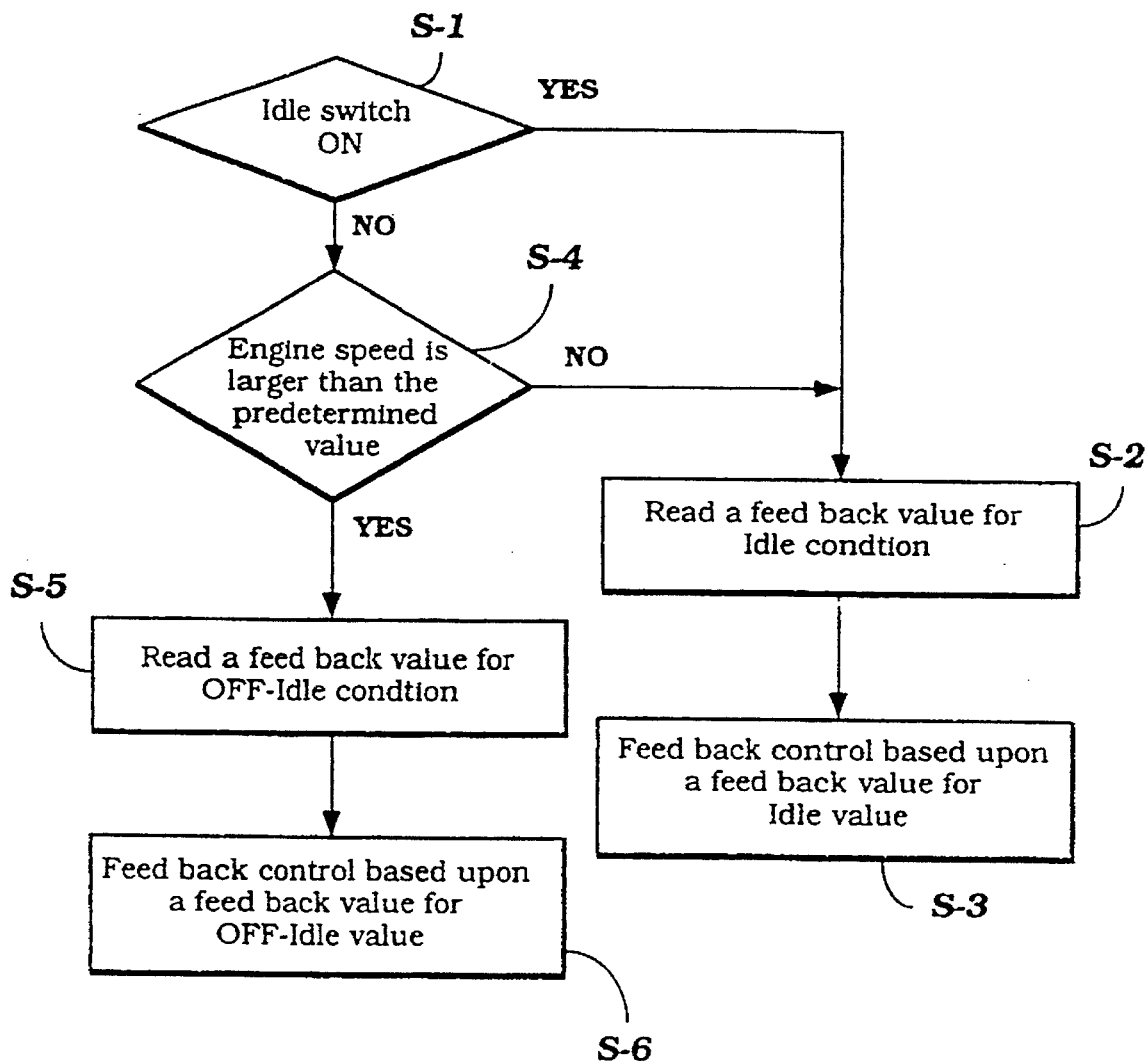
FIG. 6 is a block diagram showing how the feedback control is determined depending upon whether the engine is operating at idle or off/idle.

If, on the other hand, the output signal indicates the absence of a rich mixture at the Step S-2, the program moves to the Step S-4 so as to cause a slight richening of the fuel by closing the stepping motor 101 and air bleed valve 98 so as to enrichen the mixture. The speeds at which the stepping motor 101 are operated are, as has been previously noted, determined by whether the engine is operating in an idle or off/idle condition and as is shown in FIG. 4. The determination of whether the feedback value should be "1" or "2" (engine at idle or off/idle) is depicted in FIG. 6. In this routine, the ECU 72 performs a first step S-1 which determines whether the throttle valve 86 is in its idle or off/idle condition by indicating whether an idle switch is on or the throttle position sensor indicates that the throttle valve 86 is in its idle condition. If the idle switch is on, the program moves to the Step S-2 so as to read the feedback value for idle condition ("1" in the previously described condition) and the program then moves to the Step S-3 so as to maintain feedback control based upon the selected idle condition feedback value.

If, however, the idle switch is not determined to be on at the Step S-1, the program then moves to the Step S-4 to read the engine speed. If the engine speed is, at the Step S-4, determined to be still at approximately normal idle condition, the program returns to the Step S-2 to maintain control at the idle feedback value. That is, under this condition it may be determined that the throttle valve has been opened but that the engine, for some reason, is still operating at or near idle speed.

If, however, at the Step S-4 it is determined that the engine speed is above the predetermined speed indicating that the engine is truly operating in an off/idle range, then the program moves to the Step S-5 so as to read the feedback value for the off/idle condition (see also FIG. 4). This may be either the value "2" as previously noted for off/idle or, alternatively, a higher feedback value if an acceleration condition is sensed, as will be described by reference to FIG. 7.

The program then moves to the Step S-6 so as to maintain the air/fuel ratio using the feedback value selected for off/idle conditions.

Figure 7:
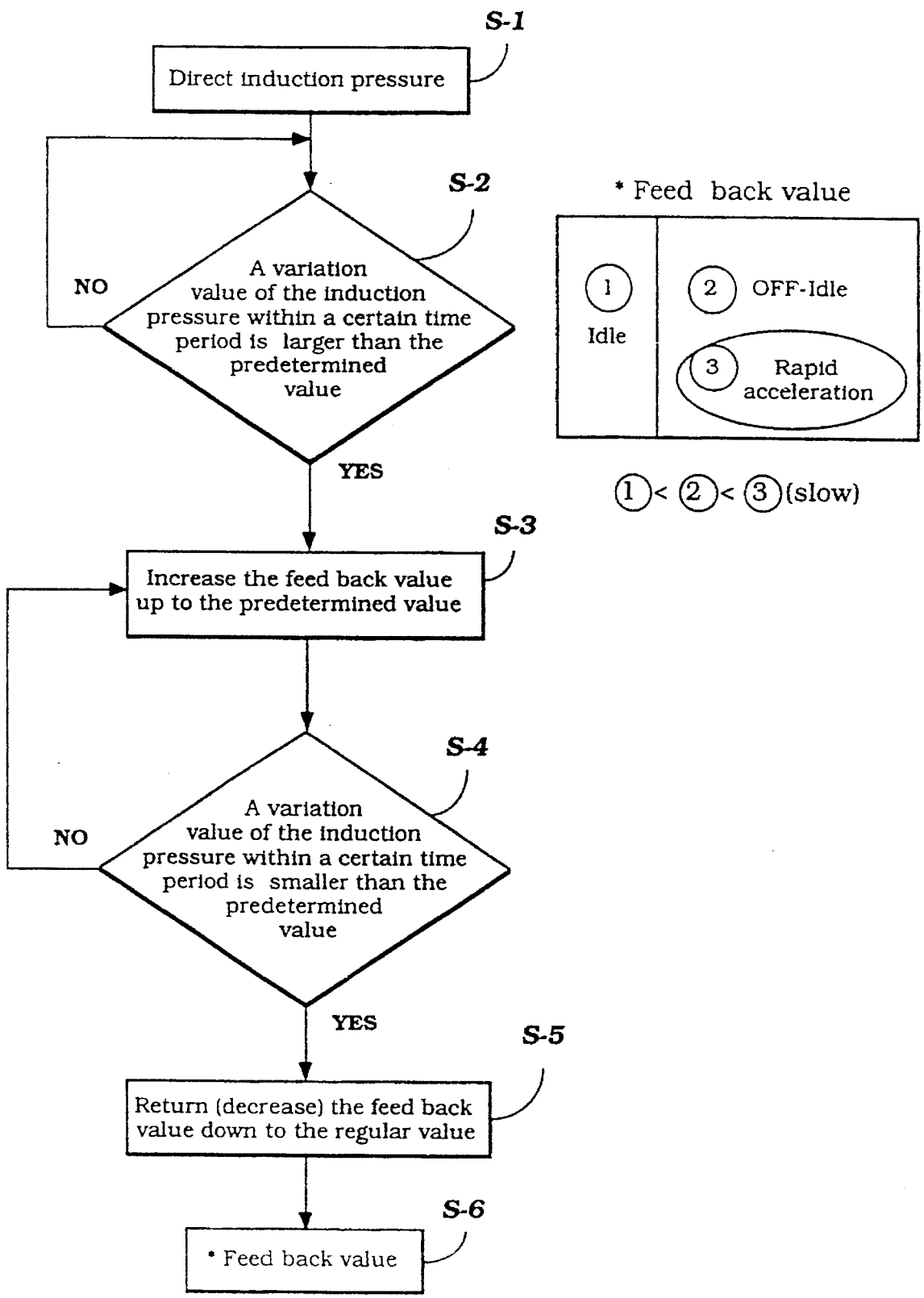
FIG. 7 is a block diagram showing the control routine during rapid acceleration.
Figure 8:
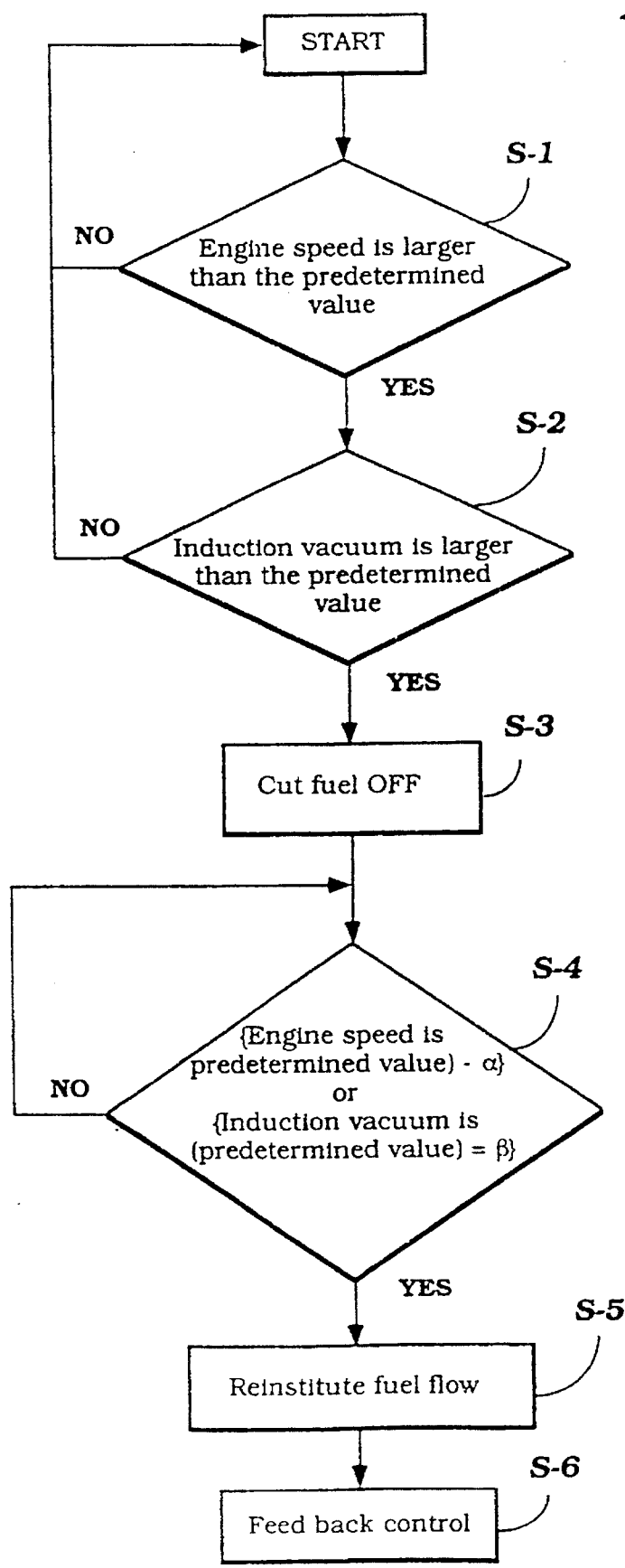
FIG. 8 is graphical view showing the control routine during extreme decelerations.

Referring now to FIG. 7, the routine for controlling the air bleed valve 98 under rapid acceleration conditions will be described. This figure shows an embodiment wherein rapid acceleration conditions are determined by sensing a rapid change in induction system pressure. It should be understood that other methods may be employed for determining rapid acceleration such as rapid opening of the throttle valve 86.

In this program, the ECU 72 initially reads induction system pressure at the Step S-1 and then measures induction system pressure at a further time period at the Step S-2 to determine if there is a greater than predetermined amount of induction system pressure variation in the given time period. This is an indication that the engine is being accelerated rapidly. If rapid acceleration is not determined at the Step S-2, the program returns back and repeats.

If, however, it is determined at the Step S-2 that the engine is rapidly accelerating due to the occurrence of more than a predetermined change in induction system pressure in a given time period the program moves to the Step S-3 to increase the feedback value up to the predetermined rapid acceleration value ("3" in this embodiment). Control of the air/fuel ratio is then achieved at this rapid feedback value. The program then moves to a Step S-4 to determine if the induction system pressure is continuing to change at a rapid rate. This is determined by sensing whether the variation in the induction system pressure within a certain time period is smaller than the predetermined value applied at Step S-2. If it is not, it is assumed that the engine is continuing to be accelerated and the program repeats back to the Step S-3.

If, however, it is determined at the Step S-4 that the induction system pressure is not varying, then it is determined that the acceleration condition has passed and the program moves to the Step S-5 to decrease the feedback value down to the regular off/idle value of "2" and the program then moves to the Step S-6 so as to continue to control the air bleed valve 98 at this value.

In addition to the feedback value control of the fuel/air ratio as described in the control routines, there is an additional control routine which is employed so as to insure good exhaust emission control and good fuel economy. This is a condition when there is an extreme deceleration caused by rapid closing of throttle valve 86 from a high speed operation. If the fuel circuits are maintained open under this condition, a high vacuum will be exerted at the idle discharge port provided for by the conduit 92 and also at the main metering jet 88. Therefore and as has been previously noted, either or both of the idle circuit cutoff valve 111 or the quick air bleed 103 may be employed for shutting off the fuel flow under such conditions. This fuel cutoff mode is depicted in the area of FIG. 4 at HLD FC (Fuel Cut) wherein the throttle valve has been moved to the idle position and engine deceleration occurs and the fuel supply is cut off in the manner aforedescribed.

In this routine, the program starts and moves to a Step S-1 to determine if the engine speed is greater than a predetermined engine speed. If it is not, it is assumed that the engine is operating at a normal condition where fuel cut off is not required and the program repeats. If, however, it is determined that the engine speed is greater than a predetermined speed, the program then moves to the Step S-2 to determine if induction system vacuum is greater than a predetermined amount as sensed by the vacuum sensor or vacuum switch 114. If it is not, again it is assumed that there is a normal condition and the program repeats back to the start.

If, however, it has been determined at the Steps S-1 and S-2 that the engine speed is above the predetermined speed and the induction vacuum is greater than a predetermined value then the program moves to the Step S-3 to cut off the fuel supply. As has been noted, this is done by the ECU either opening the quick air bleed valve 103 so as to reduce the drawing of fuel into the chamber 89 and/or closing the idle shutoff valve 111 depending upon whether either or both of these types of shutoff are employed.

The program then moves to the Step S-4 which is a step that introduces a hysteresis in the system so that the fuel control will not be immediately reinstituted once the quick deceleration condition has passed. In the Step S-4 it is determined if the engine speed has fallen below a predetermined speed which is lower than the speed determined at the Step S-1 or if the induction vacuum is less than a predetermined amount either of which conditions indicate that the deceleration condition has depleted. If neither condition exists, the program repeats back to the Step S-4.

If, however, the deceleration condition has been determined to have ceased by more than a predetermined amount as determined at the Step S-4, the program moves to the Step S-5 to reinstitute fuel flow with hysteresis. This is done by closing either the quick air bleed valve 103 or opening the idle circuit fuel control valve 111 or both if they both exist. The program then moves to the Step S-6 so as to return to normal feedback control depending upon the other parameters previously noted. This is also indicated by the areas TDFC in FIG. 4.

There are two additional control ranges shown in FIG. 4 that should be described. These are control ranges wherein the air bleed control valve 98 is operated so as to provide a richer than normal mixture so as to protect the catalyst in the catalytic converter. The first of these ranges is indicated in FIG. 4 as HLD FUL (hold full) range. Under this condition, it is determined that a rich fuel/air mixture is required in order to protect the catalyst and the air bleed valve 98 is closed to a stepping value of approximately 30 so as to provide a rich condition to protect the catalyst.

There is a further range wherein rich mixture is necessary but not quite as rich and this is shown in the area HLD NE in FIG. 4 wherein a rich mixture is maintained but not quite as rich as in the HLD FUL range. This range may be a step of approximately 35.

The operation of the system as thus far described has been made in conjunction with a carburetor having the auxiliary circuits and air bleeds and controls as shown in FIG. 1. It has been noted, however, that either the quick air bleed 103 or the idle fuel shut-off 111 may be deleted. In some instances, both of these devices can be deleted if deceleration fuel shutoff is not required. Also, the enrichment system, which as has been noted is primarily for the sole purpose of testing the operational characteristics of the oxygen sensor 106 may be deleted. Also, in some instances it may be possible to delete the use of the air bleed valve 98 and to have only a fixed air bleed into the chamber 89. If this is done, the air/fuel ratio may be changed by changing the position of the fuel control valve 91.

The enrichment fuel may also be supplied to the engine at a place other than directly into the intake manifold plenum chamber 33. For example, this fuel may be introduced through a separate passage formed directly in the carburetor 31.

The foregoing described control routines are in employed with the engine induction system as shown in FIG. 1 and including an air valve or constant depression type of carburetor 29. However, it is to be understood that these control routines may also be employed with systems including conventional venturi type carburetors, for example those shown in the aforenoted co-pending applications of which this application is a continuation in part. It is believed that those skilled in the art will readily understand how these control routines may be employed to any of the=conventional carburetion systems disclosed in those co-pending applications the disclosures of which are incorporated herein by reference. Of course, the system will not have the full advantages of those employing an air valve or constant depression type of carburetor. Nevertheless, the application of these control routines to the arrangements shown in the various embodiments of the co-pending applications will be extremely effective in providing good exhaust emission control and fuel economy, particularly when operating on a gaseous fuel. It is to be understood, however, that certain facets of the invention may also be employed for maintaining air/fuel ratio in liquid fueled engines embodying either conventional venturi type carburetors or air valve type of carburetors.

It is also to be understood that the invention may be employed in conjunction with carburetors of the type known as "staged carburetors". This type of carburetor has some of the attributes of a conventional carburetor and some of the attributes of an air valve type of carburetor. That is, these staged carburetors have at least a pair of barrels that are operated in staged sequence so as to provide, in effect, a varying flow area and a more uniform pressure drop across the device during engine operation.

Figure 9:
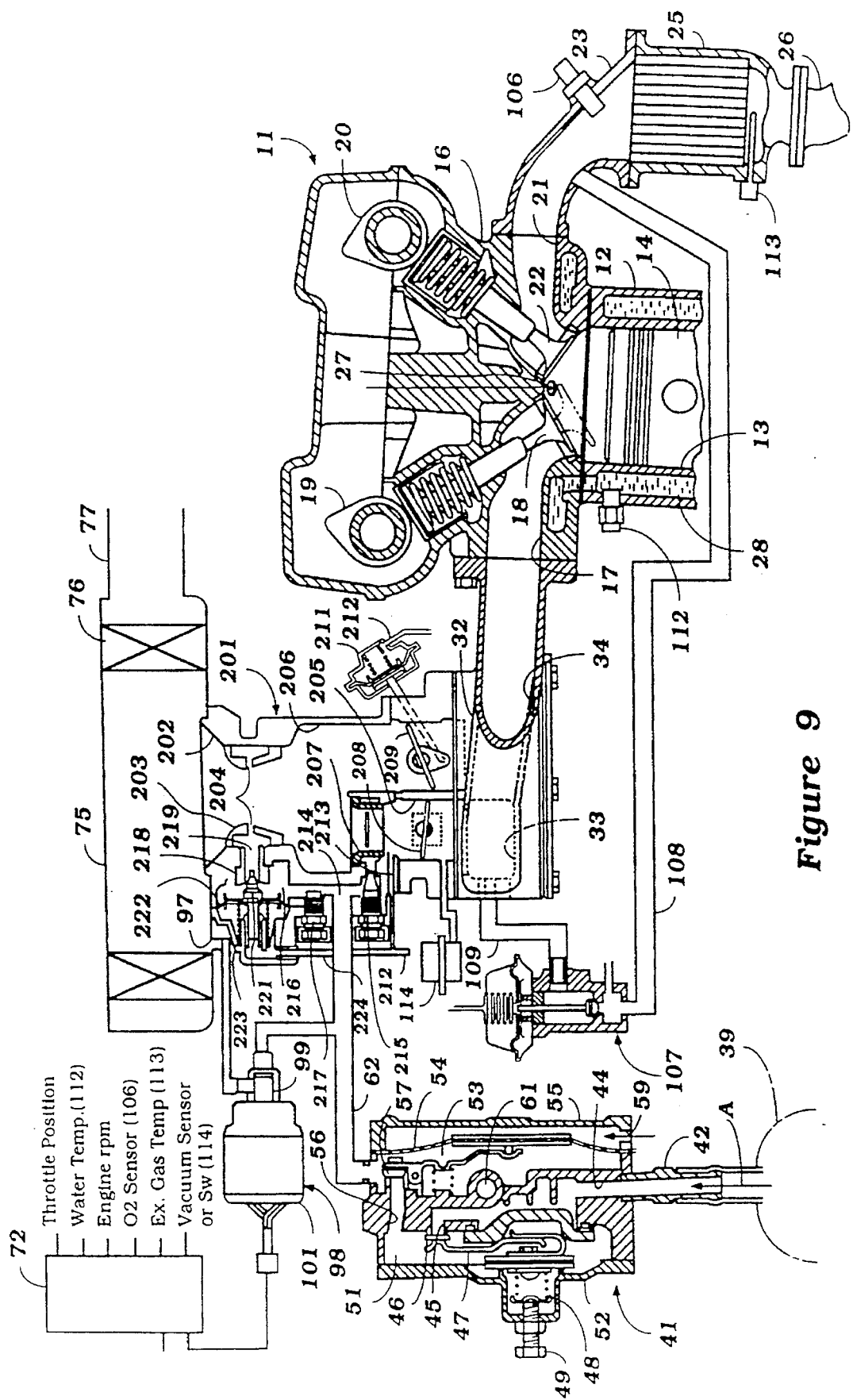
FIG. 9 is a partially schematic cross sectional view, in part similar to FIG. 1, and shows another embodiment of the invention.

FIG. 9 shows a type of staged carburetor modified to operate on a gaseous fuel and employ control routines of the type described i. The embodiment of FIG. 9 differs from the embodiment of FIG. 1 solely in the construction of the charge former associated with the engine 11 and certain of the circuitry associated with the charge former. For that reason, components of this embodiment which are the same or substantially the same of the embodiment of FIG. 1 have been identified by the same reference numerals and will not be described again in detail, except insofar as is necessary to understand the construction and operation of this embodiment.

In is embodiment, the pressure regulator 41 does not include an enrichment stage. It is to be understood, however, that this embodiment may also be provided with an enrichment stage and an enrichment strategy of the type previously described in order to assure that the oxygen sensor 106 is at its operating temperature.

In this embodiment, a charge former in the form of a two stage, two barrel carburetor, indicated generally by the reference numeral 201 is provided and receives air from the air cleaner 75 and delivers it to the intake manifold 32. The carburetor 201 has an air horn 202 in which a venturi section 203 incorporating a fuel discharge 204 is provided. The venturi section 203 serves a primary barrel 205 and a secondary barrel 206. The primary barrel 205 is provided with its own venturi section 207 that has a fuel discharge circuit which receives fuel, in a manner which will be described. A throttle valve 208 is provided in the primary barrel 205 and is operated by the accelerator pedal or throttle control in a conventional manner.

The secondary barrel 206 does not have any venturi section and all fuel that flows through this barrel is supplied by the main venturi section fuel discharges 204. A throttle valve 209 is provided in the secondary barrel 206 and is operated by a vacuum servo motor 211 which has a pressure conduit 212 that extends to a pressure pick up point 213 provided in the primary barrel 205 downstream of the venturi section 207. As is conventional with two stage carburetors, when there is adequate air flow through the primary barrel 205 to indicate the need for additional air flow, the vacuum at the pressure port 213 will rise sufficiently to cause the servo motor 211 to open the throttle valve 209.

The sub-atmospheric pressure conduit 62 leading from the regulator stage 53 delivers fuel to a fuel chamber 214 Of the carburetor 201. This fuel chamber 214 registers with the fuel discharge provided in the venturi section 207 of the primary barrel 205 and a flow controlling needle valve 215 sets the initial setting for the air/fuel ratio supplied by the primary barrel 205 to the engine 11. As with the previously described embodiments, the air/fuel ratio is maintained constant by operating the air bleed valve 98 in the manner previously described. As with the previously described embodiment, the air bleed valve 98 takes air from the air cleaner port 97 downstream of the filter element 76 and mixes it with the fuel flowing through the conduit 62 to control the air/fuel ratio.

The fuel chamber 214 of the carburetor 202 also supplies the main nozzle discharge ports 204 through a second chamber 216 with the flow between the chambers 214 and 216 being controlled by an adjustable valve 217 for setting the initial air/fuel ratio. In addition, a valve seat 218 is provided for controlling the communication of the chamber 216 with a fuel passage 219 formed in the venturi section 203 and from which the discharge ports 204 extend. A controlling needle valve 221 is affixed to a diaphragm 222 and controls the opening and closing of the valve seat 218. A coil compression spring 223 normally urges the valve 221 into a closed position. The back side of the diaphragm 222 is exposed to the pressure at the pressure port 213 through a further conduit 224.

When the engine is operating a low and mid-range speeds and the throttle valve 209 is closed, there is a danger that air could be drawn into the fuel chamber 214 from the discharge ports 204 of the main venturi section 203. Under this condition, however, the coil spring 223 keeps the valve member 221 in its closed position and no air bleed will occur. However, as the engine speed and load increases and as the air flow through the primary barrel venturi section 207 increases, there will be a pressure decrease in the conduit 224 and chamber on the backside of the diaphragm 222 and the needle valve 221 will begin to open. Under this condition, fuel will be discharged through the discharge ports 204 and the air/fuel ratio of this fuel discharge is also controlled by the stepping motor 98.

FIG. 9 does not show an idle circuit for the carburetor 201 but it is to be understood that the primary barrel 205 may be provided with an idle circuit similar to the idle circuit employed in the embodiment of FIG. 1 and which may include a shutoff system for shutting off the supply of fuel under extreme decelerations.

In the embodiments described and particularly those employed using an air valve or constant depression type of carburetor, the fuel/air control has been managed by, at least partially, sensing the air flow through the induction system in the charge former. It is to be understood, however, that more accurate air flow sensing may be accomplished by providing an air flow sensor of any known type upstream of the carburetor, for example in the air inlet system. In such arrangements, the output from the air flow sensor will also be transmitted to the ECU 72 so that the ECU 72 can more accurately control the amount of fuel supplied in relation to the actual air flowing through the system. It is believed obvious to those skilled in the art how this can be done from this description.

It should be readily apparent from the aforedescribed constructions that the embodiments of the invention both illustrated and described, including those embodying the structure shown in the aforenoted co-pending applications is extremely effective in providing good fuel air control for an engine, rapid heat up of the catalytic converter, without supplying excess fuel, and a way in which the operation of the oxygen sensor and its reaching its operating temperature can be easily checked without adversely affecting either performance in the terms of the output of the engine or exhaust emission control. Of course, the foregoing descriptions is that of preferred embodiments of the invention and various changes and modifications may be made without departing from the spirit and scope of the invention, as defined by the appended claims.

We claim:

1. A charge forming and induction system for an internal combustion engine having a combustion chamber, an induction system for supplying a charge to said combustion chamber, said induction system comprising a charge forming device having an induction passage communicating at one end with atmospheric air and at another end with said combustion chamber, a throttle valve in said induction passage, means for automatically controlling the position of said throttle valve to maintain a substantially constant pressure in the induction passage in the area of the throttle valve during the running of said engine, a main fuel discharge circuit discharging into said induction passage contiguous to said throttle valve and including a fuel control valve for controlling the amount of fuel supplied from said main fuel discharge circuit, means for controlling the condition of said fuel control valve in response to the position of said throttle valve, an idle discharge circuit for supplying fuel to said engine downstream of said main fuel discharge circuit, a source of gaseous fuel under pressure as a liquid, means for supplying fuel from said source to said fuel discharge circuits, an exhaust system for said engine, a sensor in said exhaust system for sensing a characteristic of the exhaust gases from said engine, and means for selectively adding air to the fuel supplied to at least one of said fuel discharge circuits in response to the signal from said sensor for controlling the fuel/air ratio.

2. A charge forming system as set forth in claim 1, wherein the sensor comprises an oxygen sensor which senses a rich fuel condition.

3. A charge forming system as set forth in claim 2 wherein the means for supplying fuel from the source to the fuel discharge circuits includes means for effecting vaporization of the fuel and regulation of the pressure of the fuel supplied to the fuel discharge circuit.

4. A charge forming system as set forth in claim 3 wherein the pressure of the fuel supplied to the fuel discharge circuits is below atmospheric pressure.

5. A charge forming system as set forth in claim 2, further including means for supplying additional fuel to the engine through the induction system during the starting and warm-up operation of the engine and when the oxygen sensor is below its operating temperature for providing an output signal from the oxygen sensor immediately upon the oxygen sensor reaching its operating temperature.

6. A charge forming system as set forth in claim 5 wherein the additional fuel is not supplied until after the engine is running.

7. A charge forming system as set forth in claim 6 further including temperature responsive means for precluding the supply of additional fuel when the temperature is above a predetermined value.

8. A charge forming system as set forth in claim 7 wherein the temperature is the temperature is the temperature in the exhaust system contiguous to the oxygen sensor.

9. A charge forming system as set forth in claim 8 further including a further fuel control valve for controlling the amount of fuel supplied to the fuel discharge circuits.

10. A charge forming system as set forth in claim 9 wherein the further fuel control valve is adjusted to compensate for the type of gaseous fuel burned.

11. A charge forming system as set forth in claim 9 wherein the further fuel control valve is adjusted in response to an engine condition.

12. A charge forming system as set forth in claim 9 further including a quick air bleed valve for supplying air under atmospheric pressure to the fuel discharge circuits for precluding the discharge of fuel from the fuel control circuits in response to a condition.

13. A charge forming system as set forth in claim 2 wherein the control of the air/fuel ratio is a feedback control controlled by the output of the oxygen sensor.

14. A charge forming system as set forth in claim 13 wherein the feedback control is provided at different rates in response to different engine running conditions.

15. A charge forming system as set forth in claim 14 wherein the feedback control operates faster when the engine is operating on off/idle condition then when the engine is operating at idle condition.

16. A charge forming system as set forth in claim 14 wherein the rate of feedback control is also changed when the engine is being accelerated.

17. A charge forming system as set forth in claim 13 wherein the feedback control includes means for precluding the initiation of feedback control until after the sensor reaches its operating condition.

18. A charge forming system as set forth in claim 17 further including means for testing when the sensor is at an operating condition for initiating feedback control.

19. A charge forming system as set forth in claim 18 wherein the operating temperature of the sensor iS tested by enriching the fuel air supply supplied to the engine.

20. A charge forming system as set forth in claim 19 wherein the enrichment fuel supply is supplied only if the oxygen sensor is below its operating temperature.

21. An emission control system for an internal combustion engine having a combustion chamber, an exhaust system for discharging exhaust gases from said combustion chamber to the atmosphere, an oxygen sensor in said exhaust system for sensing a rich fuel/air condition in the exhaust gases of said engine, an induction system including charge forming means for supplying a fuel/air mixture into said combustion chamber for combustion therein, means for controlling said charge former from the signal of said oxygen sensor for maintaining a desired fuel/air ratio for exhaust emission control, means for providing a rich fuel/air mixture to said combustion chamber during initial engine operation for testing when said oxygen sensor is operative to supply a signal indicative of a rich fuel condition, and means for thereafter controlling the supply of fuel/air mixture by said oxygen sensor.

22. A system as set forth in claim 21 wherein the fuel of the fuel/air mixture is a gaseous fuel supplied from a source wherein the gaseous fuel is stored under pressure as a liquid.

23. A system as set forth in claim 22 wherein the means for supplying fuel from the source includes means for effecting vaporization of the fuel and regulation of the pressure of the fuel supplied.

24. A system as set forth in claim 23 wherein the pressure of the fuel supplied is below atmospheric pressure.

25. A system as set forth in claim 21 wherein the fuel/air ratio is controlled by selectively adding air with the fuel supplied.

26. A system as set forth in claim 25 further including a fuel control valve for controlling the amount of fuel supplied to the charge forming means.

27. A system as set forth in claim 26 wherein the further fuel control valve is adjusted to compensate for the type of fuel burned.

28. A system as set forth in claim 26 wherein the fuel control valve is adjusted in response to an engine condition.

29. A system as set forth in claim 21, wherein the rich fuel/air mixture is supplied by means for supplying additional fuel to the engine through the induction system during the starting and warm-up operation of the engine and when the oxygen sensor is below its operating temperature for providing an output signal from the oxygen sensor immediately upon the oxygen sensor reaching its operating temperature.

30. A system as set forth in claim 29 wherein the additional fuel is not supplied until after the engine is running.

31. A system as set forth in claim 30 further including temperature responsive means for precluding the supply of additional fuel when the temperature is above a predetermined value.

32. A system as set forth in claim 21 wherein the control of the air/fuel ratio is a feedback control controlled by the output of the oxygen sensor.

33. A system as set forth in claim 32 wherein the feedback control is provided at different rates in response to different engine running conditions.

34. A system as set forth in claim 33 wherein the feedback control operates faster when the engine is operating on off/idle condition then when the engine is operating at idle condition.

35. A system as set forth in claim 33 wherein the rate of feedback control is also changed when the engine is being accelerated.

36. A system as set forth in claim 32 wherein the feedback control includes means for precluding the initiation of feedback control until after the sensor reaches its operating condition.

37. A system as set forth in claim 36 wherein the means for supplying fuel from the source includes means for effecting vaporization of the fuel and regulation of the pressure of the fuel supplied.

38. A system as set forth in claim 37 wherein the pressure of the fuel supplied is below atmospheric pressure.

39. An emission control system for an internal combustion engine having a combustion chamber, an exhaust system for discharging exhaust gases from said combustion chamber to the atmosphere, a catalyzer in said exhaust system for treating the exhaust gases issuing from said combustion chamber, an induction system for supplying a charge to said combustion chamber, a charge former for supplying fuel to said induction system, a source of gaseous fuel stored under pressure as a liquid, and means for supplying fuel from said source to said engine in response to at least starting of said engine for rapidly heating said catalyzer to its operating temperature.

40. A system as set forth in claim 39 wherein the charge former also receives fuel from the source for forming the charge for the induction system.

41. A system as set forth in claim 39 wherein there is no enrichment of the fuel supplied from the source to the charge former during the start-up operation.

42. A method of operating an internal combustion engine having a combustion chamber, an exhaust system for discharging combustion products from said combustion chamber, a sensor in said exhaust system for sensing a condition of the exhaust gases, an induction system for supplying a charge to said combustion chamber, said induction system comprising a charge forming device having an induction passage communicating at one end with atmospheric air and at another end with said combustion chamber, a throttle valve in said induction passage, means for automatically controlling the position of said throttle valve to maintain a substantially constant pressure in the induction passage in the area of the throttle valve during the running of said engine, a main fuel discharge circuit discharging into said induction passage and including a fuel control valve for controlling the amount of fuel supplied from said main fuel discharge circuit, means for controlling the condition of said fuel control valve in response to the position of said throttle valve, an idle discharge circuit for supplying fuel to the engine downstream of said main fuel discharge circuit and a source of gaseous fuel under pressure as a liquid, said method comprising the step of supplying fuel from said source to said fuel discharge circuits and adjusting the air/fuel ratio in response to the output of the sensor.

43. A method as set forth in claim 42 wherein air is selectively added to the fuel supplied to the fuel discharge circuits for adjusting the fuel/air ratio.

44. A method as set forth in claim 43 further including the step of controlling the amount of fuel supplied to the main fuel discharge circuit.

45. A method as set forth in claim 44 wherein the fuel control is adjusted to compensate for the type of gaseous fuel burned.

46. A method as set forth in claim 44 wherein the fuel control is adjusted in response to an engine condition.

47. A method as set forth in claim 43 wherein the air fuel ratio supplied to both circuits is controlled by adding air with the fuel supplied to the circuits.

48. A method as set forth in claim 47 further including the step of precluding the discharge of fuel from the fuel discharge circuits in response to a condition.

49. A method as set forth in claim 42 further including the step of discontinuing the supply of fuel to the fuel discharge circuits in the event of an extreme deceleration.

50. A method as set forth in claim 49 wherein discontinuing of the supply of fuel under an extreme deceleration condition is accomplished by shutting off the flow of fuel to the fuel discharge circuits.

51. A method as set forth in claim 50 wherein the stopping of the supply of fuel to the fuel discharge circuit upon extreme deceleration is accomplished by supplying air under atmospheric pressure to the fuel discharge circuits for precluding the discharge of fuel from the fuel discharge circuits.

52. A method as set forth in claim 42 further including an operator controlled throttle valve for controlling the speed of the engine and the method further comprises bypassing the throttle valve for controlling the idle speed.

53. A method as set forth in claim 42 wherein the sensed condition comprises the amount of oxygen in the exhaust.

54. A method as set forth in claim 53, further including the steps of effecting vaporization of the fuel and regulating the pressure of the fuel supplied to the fuel discharge circuits.

55. A method as set forth in claim 54, wherein the regulated pressure of the fuel supplied to the fuel discharge circuits is below atmospheric pressure.

56. A method as set forth in claim 53, further including the step of supplying additional fuel to the engine through the induction system during the starting and warm-up operation of the engine and when the oxygen sensor is below its operating temperature for providing an output signal from the oxygen sensor immediately upon the oxygen sensor reaching its operating temperature.

57. A method as set forth in claim 56 wherein the additional fuel is not supplied until after the engine is running.

58. A method as set forth in claim 56 further including precluding the supply of additional fuel when the temperature is above a predetermined value.

59. A method as set forth in claim 58 further including the step of controlling the amount of fuel supplied to the fuel discharge circuit.

60. A method as set forth in claim 58 wherein the fuel control is adjusted to compensate for the type of gaseous fuel burned.

61. A method as set forth in claim 59 wherein the fuel control valve is adjusted in response to an engine condition.

62. A method as set forth in claim 61 further including the step of supplying air under atmospheric pressure to the fuel discharge circuit for precluding the discharge of fuel from the fuel discharge circuit in response to a condition.

63. A method as set forth in claim 53 wherein the control of the air/fuel ratio is a feedback control controlled by the amount of oxygen.

64. A method as set forth in claim 63 wherein the feedback control is provided at different rates in response to different engine running conditions.

65. A method as set forth in claim 64 wherein the feedback control operates faster when the engine is operating on off/idle condition then when the engine is operating at idle condition.

66. A method as set forth in claim 64 wherein the rate of feedback control is also changed when the engine is being accelerated.

67. A method as set forth in claim 63 wherein the feedback control is not initiated until after a sensor for sensing the oxygen reaches its operating condition.

68. A method as set forth in claim 63 further including the step of testing when the sensor is at an operating condition for initiating feedback control.

69. A method as set forth in claim 68 wherein the operating temperature of the sensor is tested by enriching the fuel air supply supplied to the engine.

70. A method system as set forth in claim 69 wherein the enrichment fuel supply is supplied only if the oxygen sensor is below its operating temperature.

71. An emission control system for an internal combustion engine having a combustion chamber, an exhaust system for discharging exhaust gases from said combustion chamber to the atmosphere, an oxygen sensor in said exhaust system for sensing a rich fuel condition in the exhaust gases of said engine, an induction system including charge forming means for supplying a fuel/air mixture into said combustion chamber for combustion therein, means for controlling said charge former from the signal of said oxygen sensor for maintaining a desired fuel/air ratio for exhaust emission control, said system comprising providing a rich fuel/air mixture to said combustion chamber during initial engine operation for testing when said oxygen sensor is operative to supply a signal indicative of a rich fuel condition, and thereafter controlling the supply of fuel/air mixture by said oxygen sensor.

72. A system as set forth in claim 71 wherein the fuel of the fuel/air mixture is a gaseous fuel supplied from a source wherein the gaseous fuel is stored under pressure as a liquid.

73. A system as set forth in claim 72 further effecting vaporization of the fuel and regulation of the pressure of the fuel supplied.

74. A system as set forth in claim 73 wherein the pressure of the fuel supplied is below atmospheric pressure.

75. A system as set forth in claim 71 wherein the fuel/air ratio is controlled by mixing air with the fuel supplied.

76. A system as set forth in claim 75 further including controlling the amount of fuel supplied to the fuel discharge circuit.

77. A system as set forth in claim 76 wherein the fuel control valve is adjusted to compensate for the type of fuel burned.

78. A system as set forth in claim 76 wherein the fuel control is adjusted in response to an engine condition.

79. A system as set forth in claim 71, wherein the rich fuel/air mixture is supplied by supplying additional fuel to the engine through the induction system during the starting and warm-up operation of the engine and when the oxygen sensor is below its operating temperature for providing an output signal from the oxygen sensor immediately upon the oxygen sensor reaching its operating temperature.

80. A system as set forth in claim 79 wherein the additional fuel is not supplied until after the engine is running.

81. A system as set forth in claim 80 further including precluding the supply of additional fuel when the engine temperature is above a predetermined value.

82. A system as set forth in claim 71 wherein the control of the air/fuel ratio is a feedback control controlled by the output of the oxygen sensor.

83. A system as set forth in claim 82 wherein the feedback control is provided at different rates in response to different engine running conditions.

84. A system as set forth in claim 83 where in the feedback control operates faster when the engine is operating on off/idle condition then when the engine is operating at idle condition.

85. A system as set forth in claim 83 wherein the rate of feedback control is also changed when the engine is being accelerated.

86. A system as set forth in claim 82 wherein the initiation of feedback control is not started until after the sensor reaches its operating condition.

87. A system as set forth in claim 86 wherein the fuel from the source is vaporized and the pressure regulated.

88. A system as set forth in claim 87 wherein the pressure of the fuel supplied is below atmospheric pressure.

89. An emission control system for an internal combustion engine having a combustion chamber, an exhaust system for discharging exhaust gases from said combustion chamber to the atmosphere, a catalyzer in said exhaust system for treating the exhaust gases issuing from said combustion chamber, an induction system for supplying a charge to said combustion chamber, a charge former for supplying fuel to said induction system, said system comprising a source of gaseous fuel stored under pressure as is a liquid, and supplying fuel from said source to said engine in response to at least starting of said engine for rapidly heating said catalyzer to its operating temperature.

90. A system as set forth in claim 89 wherein the fuel from the source is also supplied to the charge former.

91. A system as set forth in claim 90 wherein there is no enrichment of the fuel supplied during the start-up operation.

\* \* \* \* \*